(12) United States Patent
Foglar et al.

(10) Patent No.: US 7,499,450 B2
(45) Date of Patent: Mar. 3, 2009

(54) ROUTER IP PORT FOR AN IP ROUTER

(75) Inventors: Andreas Foglar, München (DE); Sören Sonntag, München (DE)

(73) Assignee: Infineon Technologies AG, Munich (DE)

( * ) Notice: Subject to any disclaimer, the term of this patent is extended or adjusted under 35 U.S.C. 154(b) by 845 days.

(21) Appl. No.: 10/934,791

(22) Filed: Sep. 3, 2004

(65) Prior Publication Data

US 2005/0243818 A1 Nov. 3, 2005

Related U.S. Application Data

(60) Provisional application No. 60/567,224, filed on Apr. 30, 2004.

(51) Int. Cl.
*H04L 12/56* (2006.01)
*H04L 12/26* (2006.01)

(52) U.S. Cl. .................. 370/392; 370/401; 370/469

(58) Field of Classification Search .................. None
See application file for complete search history.

(56) References Cited

U.S. PATENT DOCUMENTS

| | | | | |
|---|---|---|---|---|
| 6,188,689 B1 * | 2/2001 | Katsube et al. | ............. | 370/389 |
| 6,208,647 B1 * | 3/2001 | Deng et al. | ................. | 370/390 |
| 6,317,434 B1 * | 11/2001 | Deng | ......................... | 370/432 |
| 7,133,403 B1 * | 11/2006 | Mo et al. | ..................... | 370/390 |
| 7,181,540 B2 * | 2/2007 | Whitaker et al. | ............ | 709/249 |

* cited by examiner

*Primary Examiner*—Chi H. Pham
*Assistant Examiner*—Soon D. Hyun
(74) *Attorney, Agent, or Firm*—Maginot, Moore & Beck

(57) ABSTRACT

Router IP port for an IP router of a IP network system, wherein the router IP port comprises: an encapsulating unit for encapsulating IP data packets received from an IP subnetwork to generate Ethernet data packets which are forwarded to an Ethernet unit of said IP router; a decapsulating unit for decapsulating Ethernet data packets received from said Ethernet unit to extract IP data packets to be forwarded; an Egress filter unit for filtering the decapsulated IP data packets extracted by said decapsulating unit in response to a match signal which is generated by an Egress comparison unit which compares a hierarchical destination address prefix of said decapsulated IP data packets logically with configuration data stored in a local memory of said router port.

47 Claims, 29 Drawing Sheets

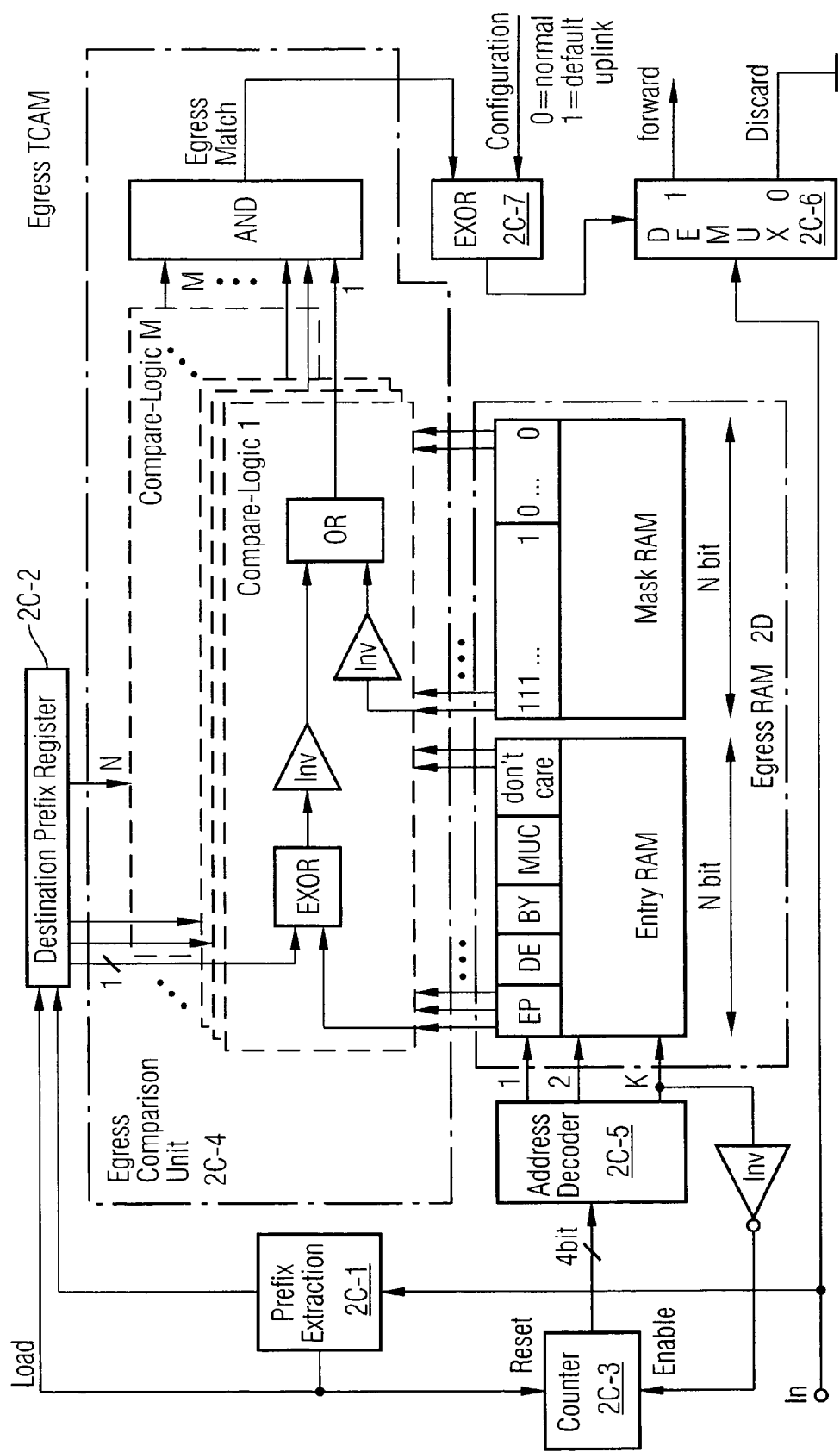

IPv6 Header

FIG 13
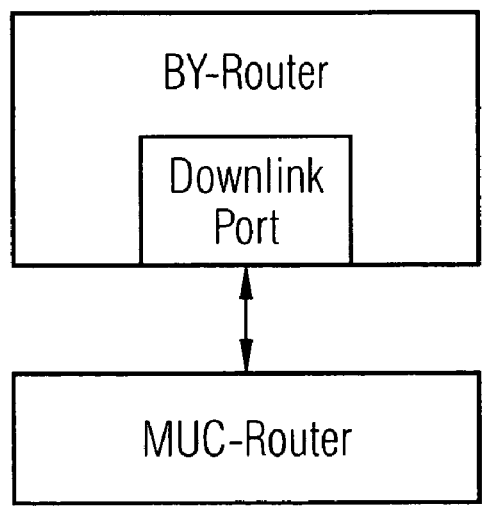

FIG 14
Peer Link Port
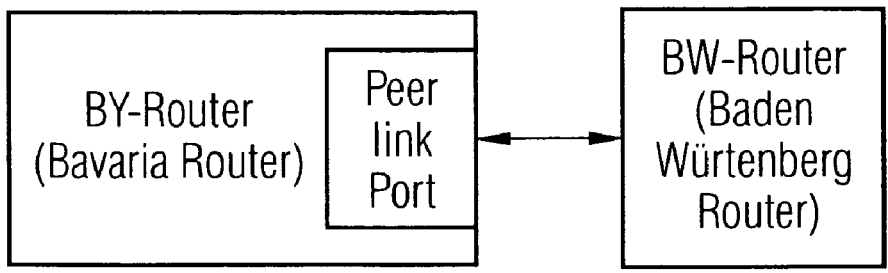
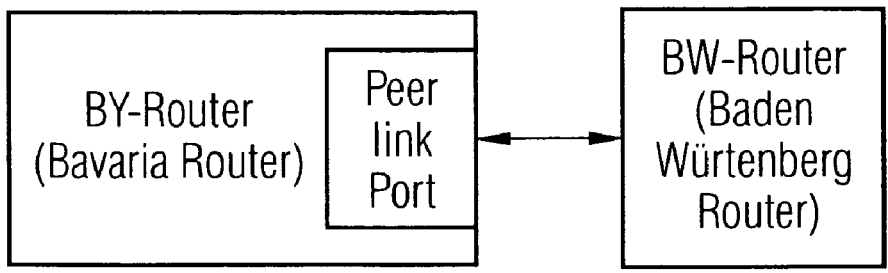

Default Uplink Port

Egress TCAM

| | | | | | | |
|---|---|---|---|---|---|---|
| Entry 1 | EP | DE | BY | MUC | Don't care | } Down link A |
| Mask 1 | 11 ... 1 | 11 ... 1 | 11 ... 1 | 11 ... 1 | 00 ... 000 | |
| Entry 2 | EP | DE | BY | AUG | Don't care | } Down link B |
| Mask 2 | 11 ... 1 | 11 ... 1 | 11 ... 1 | 11 ... 1 | 00 ...         0 | |
| Entry 3 | EP | DE | BW | Don't care | | } Peer link |
| Mask 3 | 11 ... 1 | 11 ... 1 | 11 ... 1 | 00 ...                 0 | | |
| Entry 4 | EP | DE | Don't care | | | } uplink |
| Mask 4 | 11 ... 1 | 11 ... 1 | 00 ...                              0 | | | |

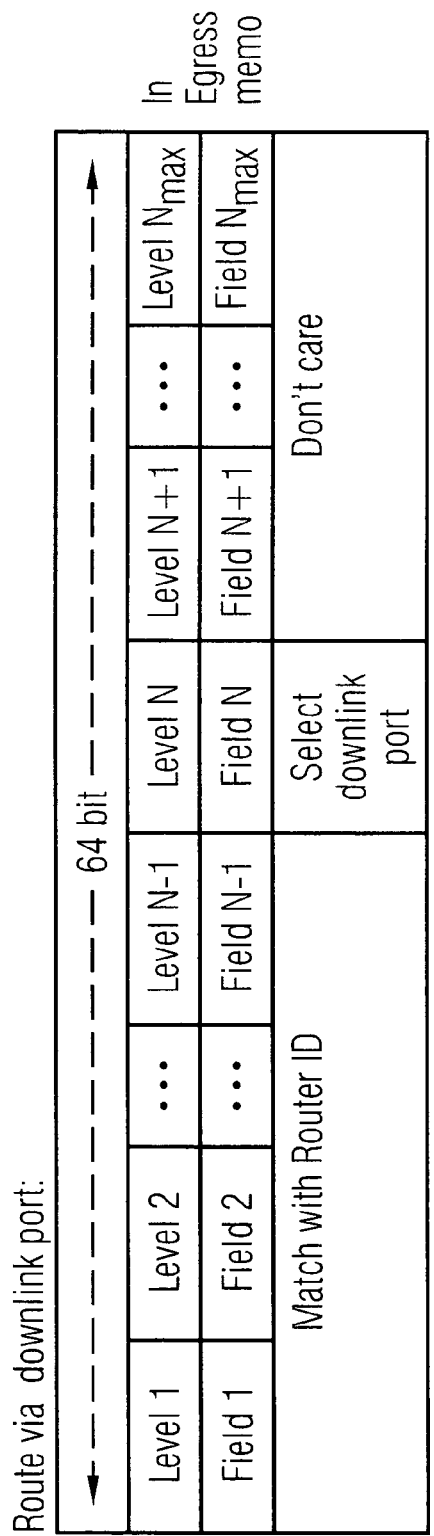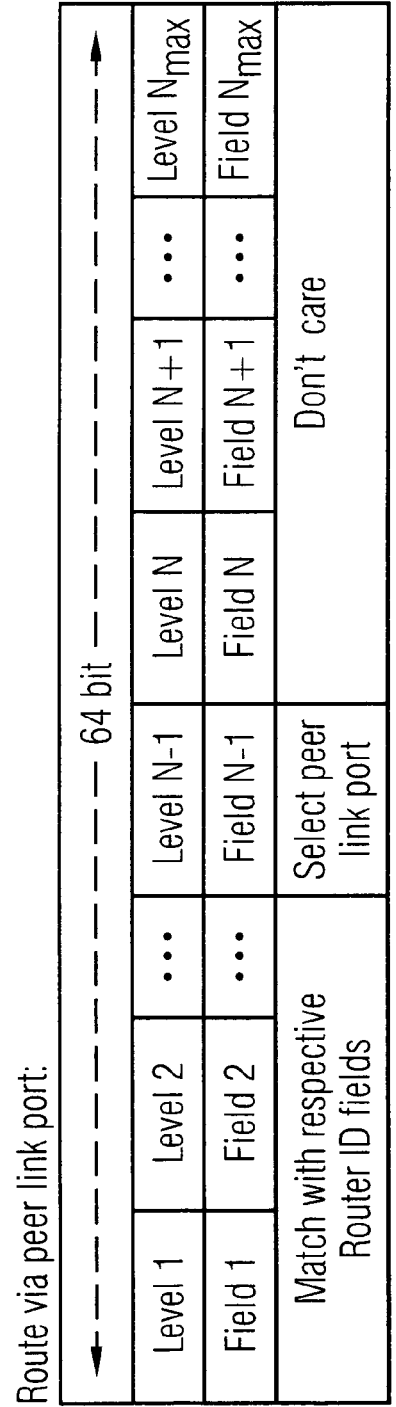

FIG 22

Route via an uplink port (1 level higher):

| Level 1 | Level 2 | ... | Level N-1 | Level N | Level N+1 | ... | Level $N_{max}$ |
|---------|---------|-----|-----------|---------|-----------|-----|-----------------|
| Field 1 | Field 2 | ... | Field N-1 | Field N | Field N+1 | ... | Field $N_{max}$ |
| Match with respective Router ID fields | | | | Don't care | | | |

←──────────────── 64 bit ────────────────→

FIG 23

Route via an uplink port (N-3 level higher):

| Level 1 | Level 2 | ... | Level N-1 | Level N | Level N+1 | ... | Level $N_{max}$ |
|---------|---------|-----|-----------|---------|-----------|-----|-----------------|
| Field 1 | Field 2 | ... | Field N-1 | Field N | Field N+1 | ... | Field $N_{max}$ |
| Match with respective Router ID fields | | | | Don't care | | | |

←──────────────── 64 bit ────────────────→

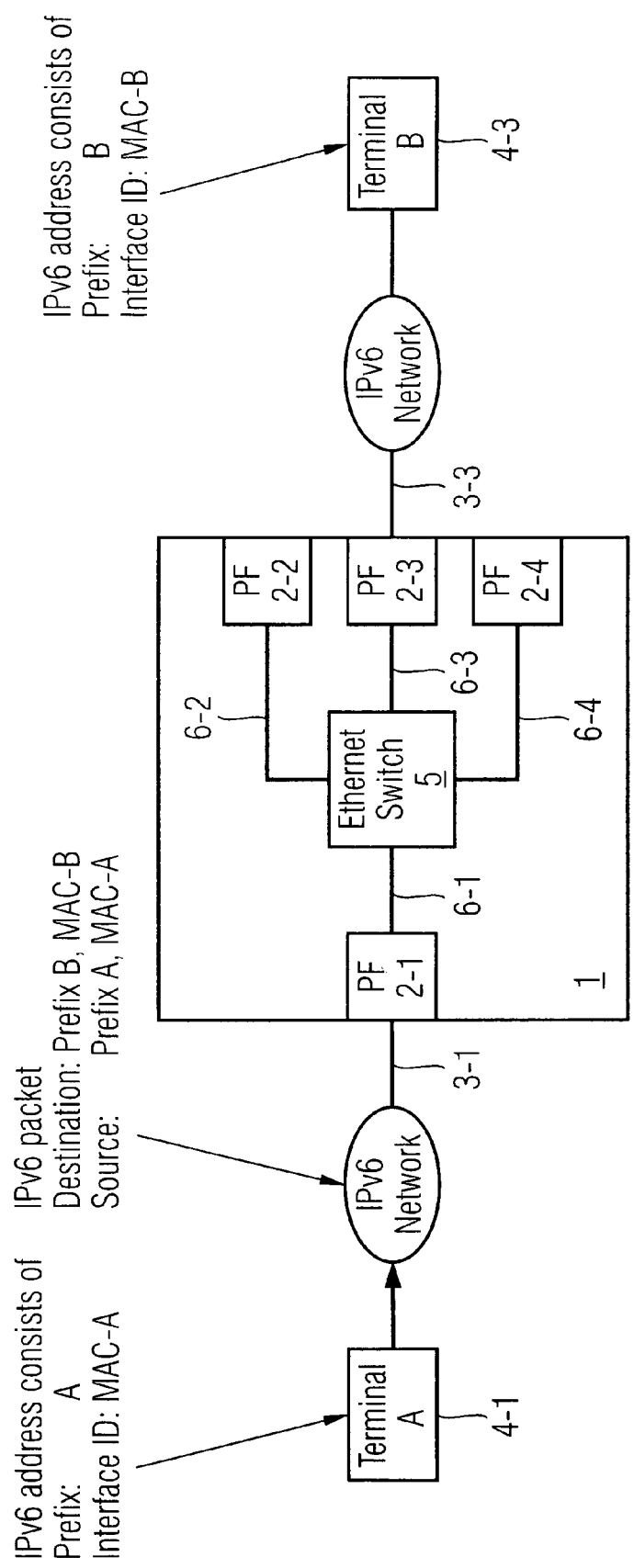

Routing Example – First Packet from A to B

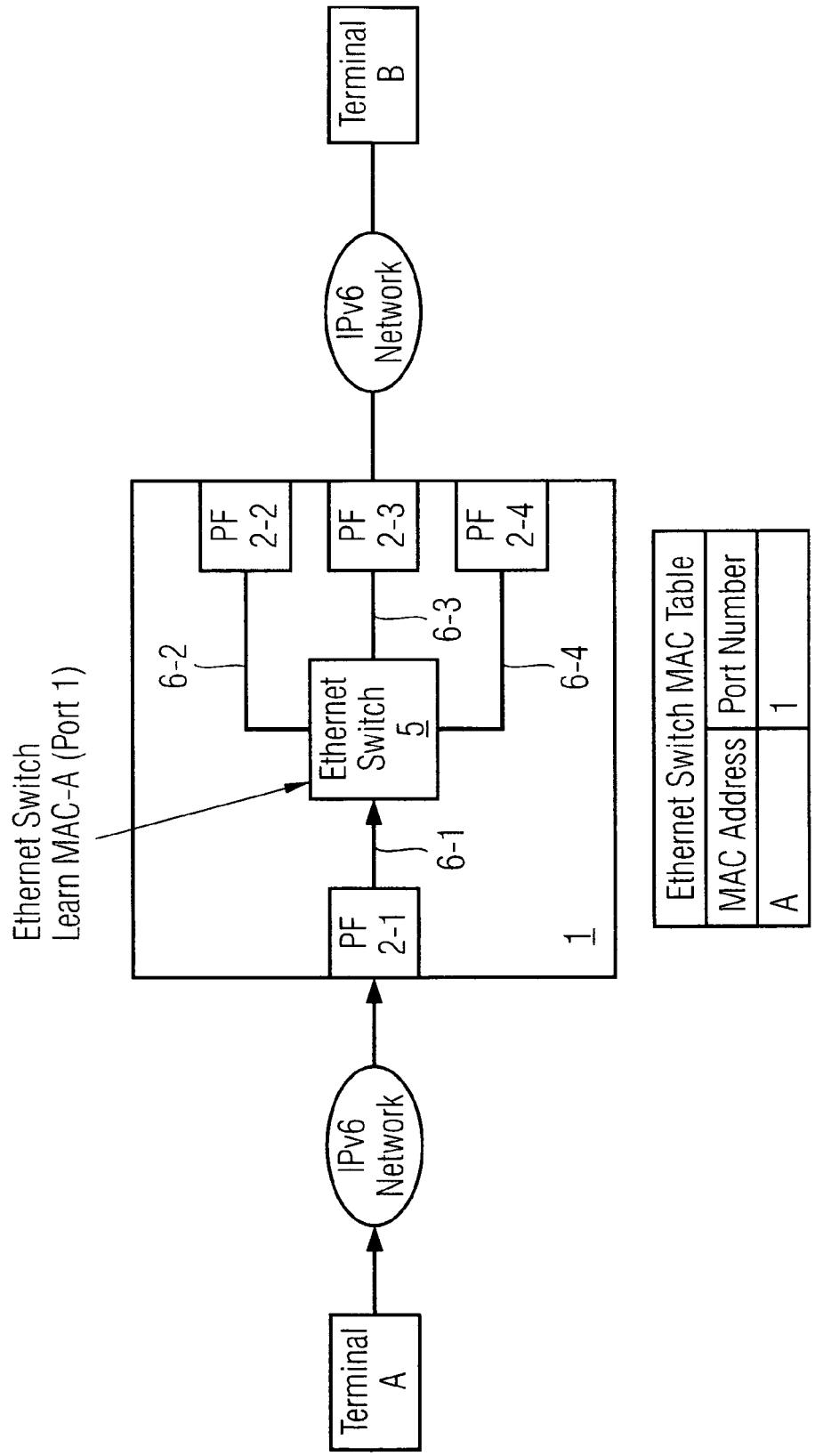

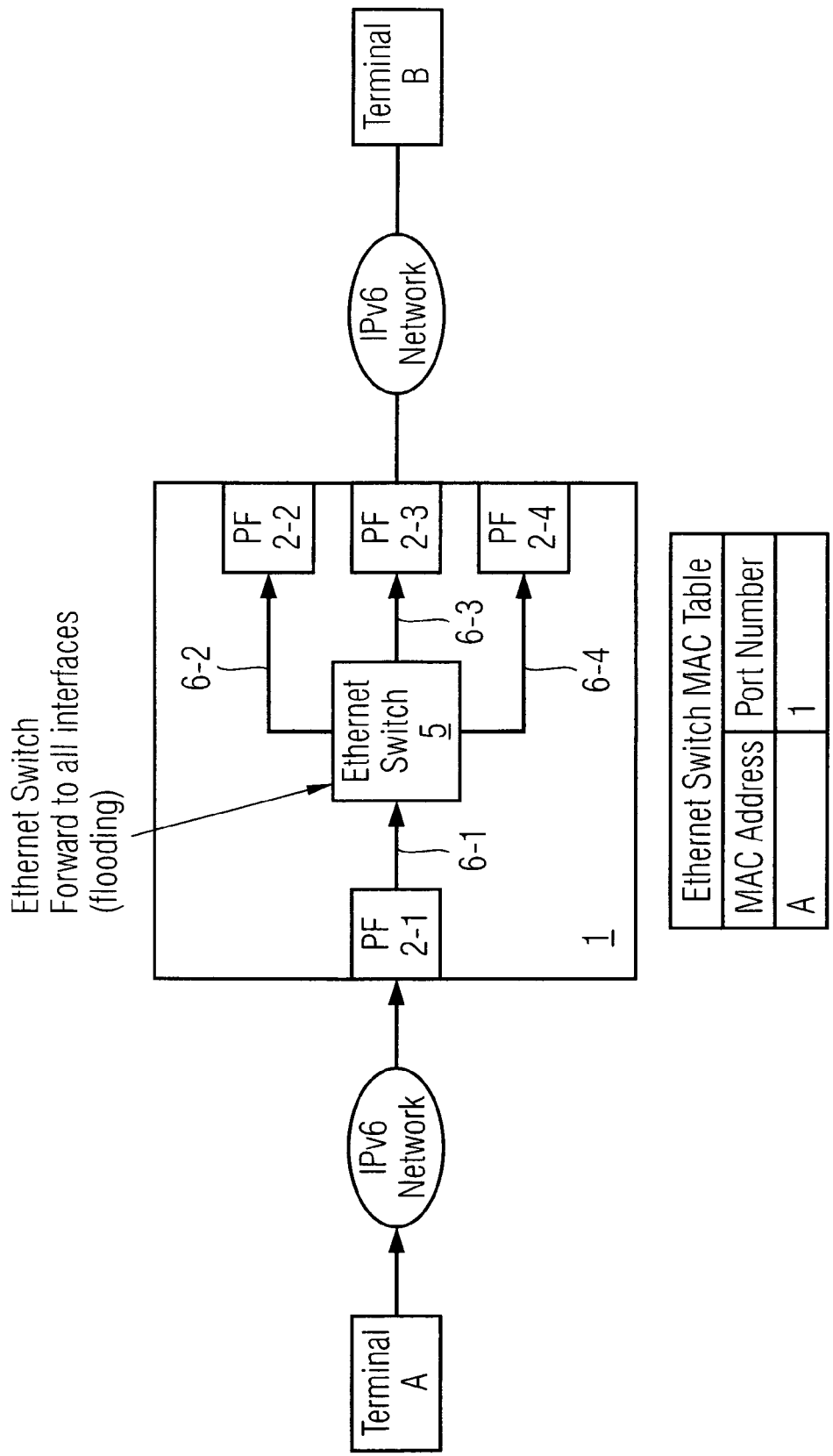

Routing Example – First Packet from A to B

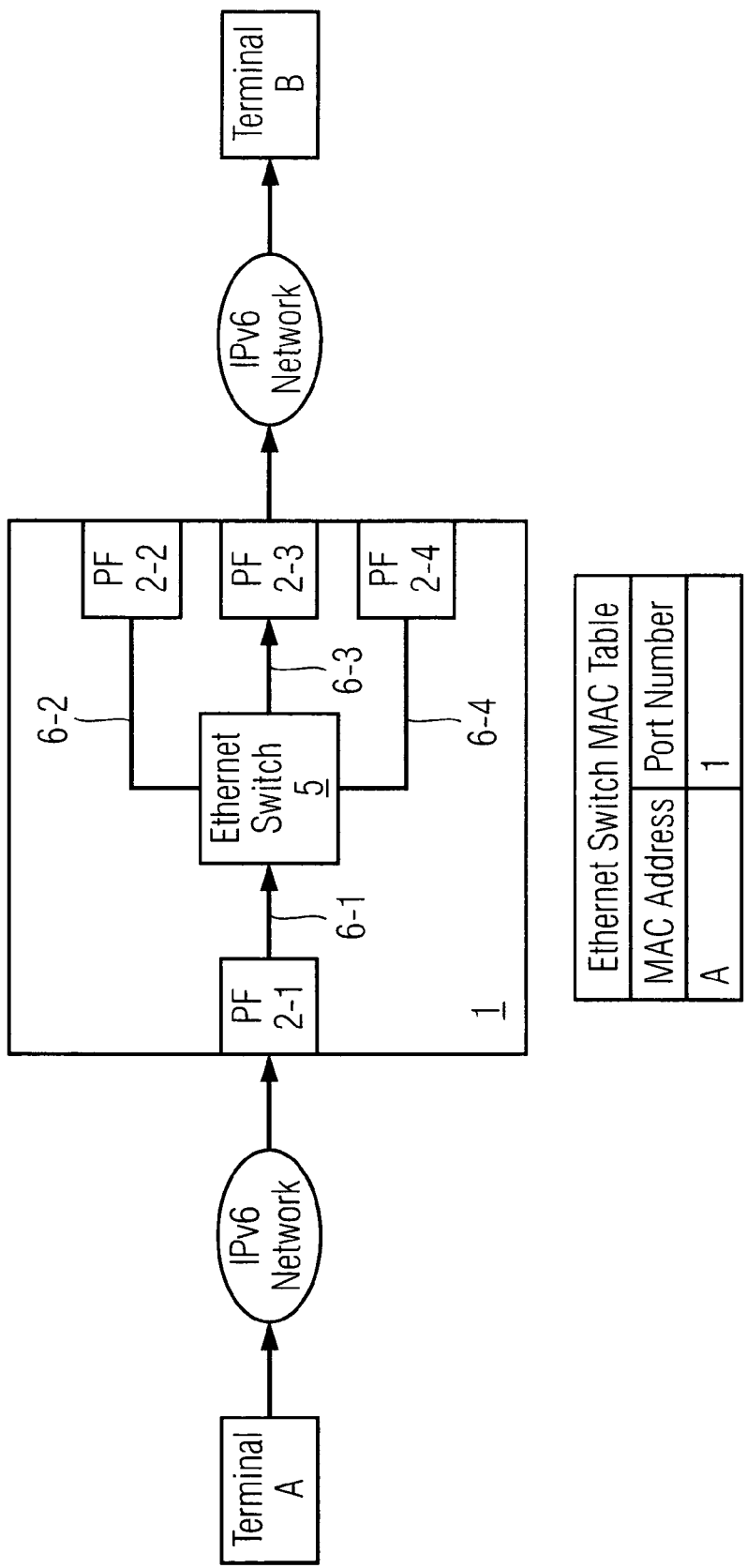

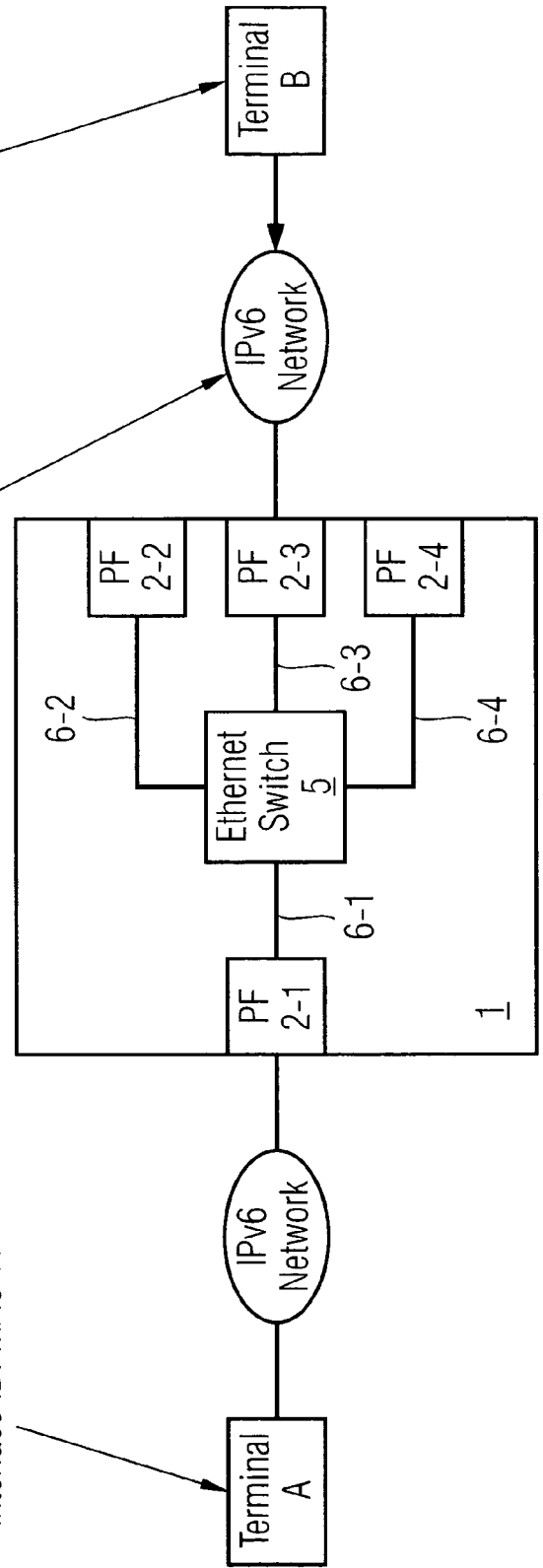

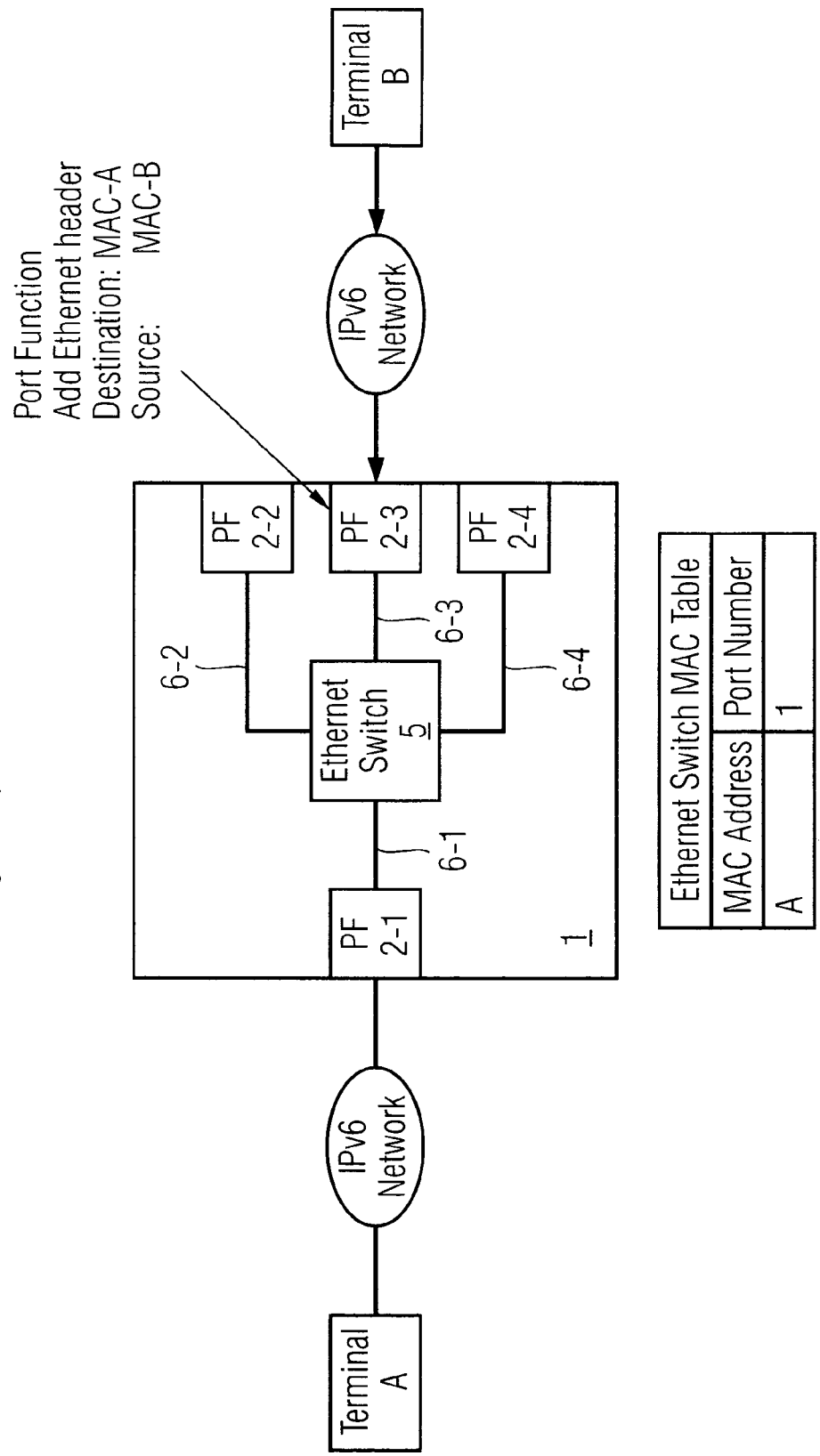

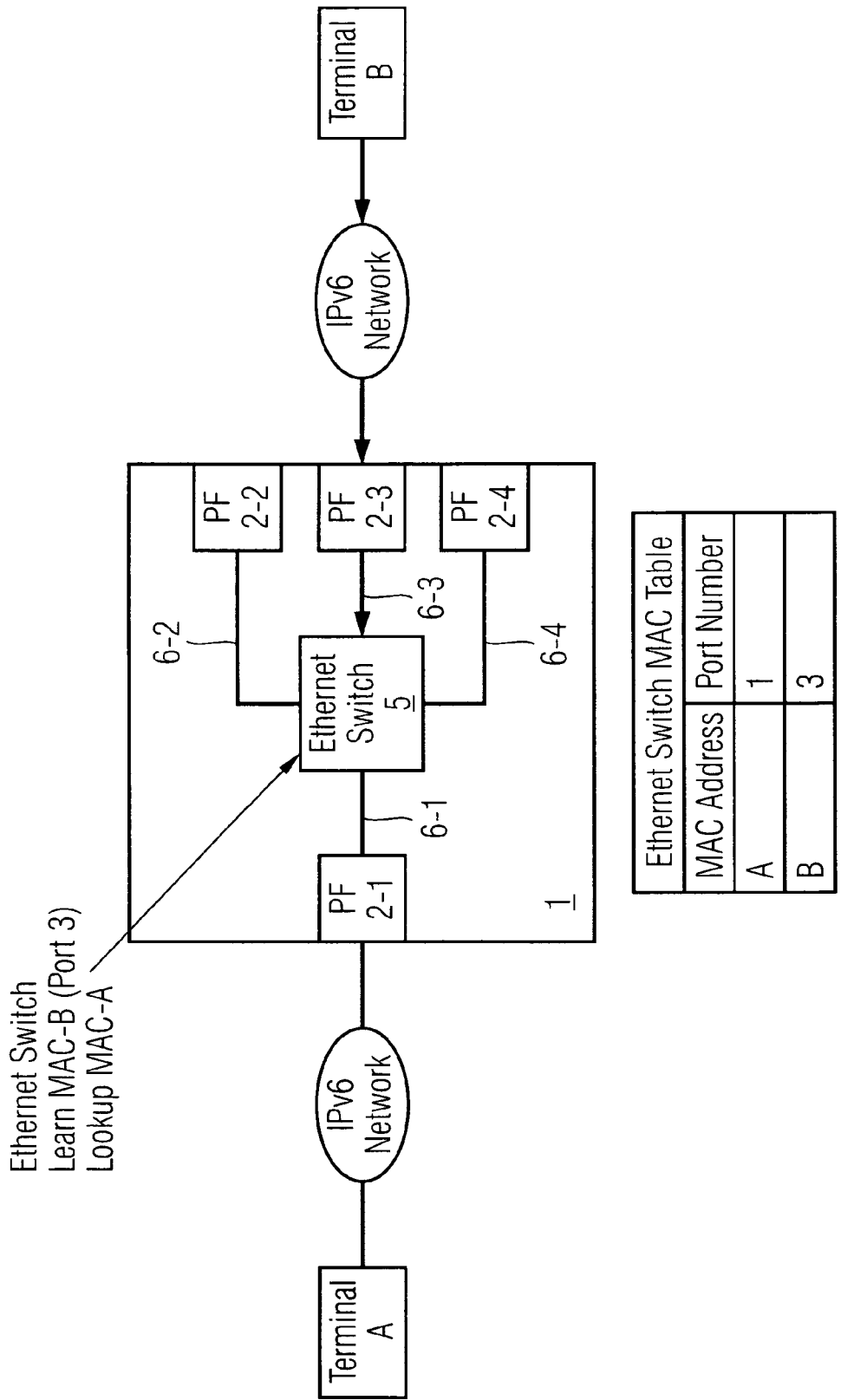

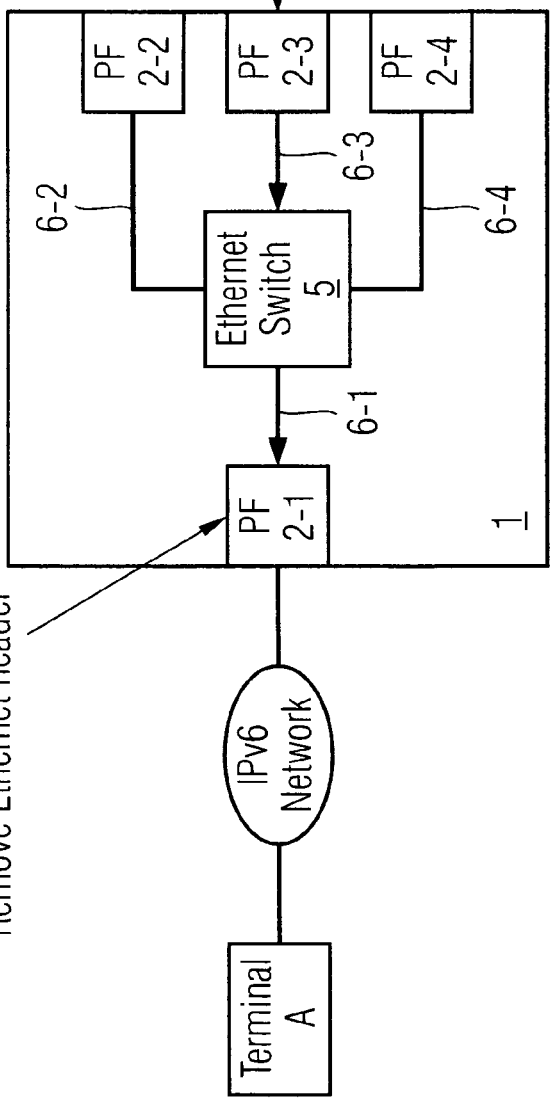

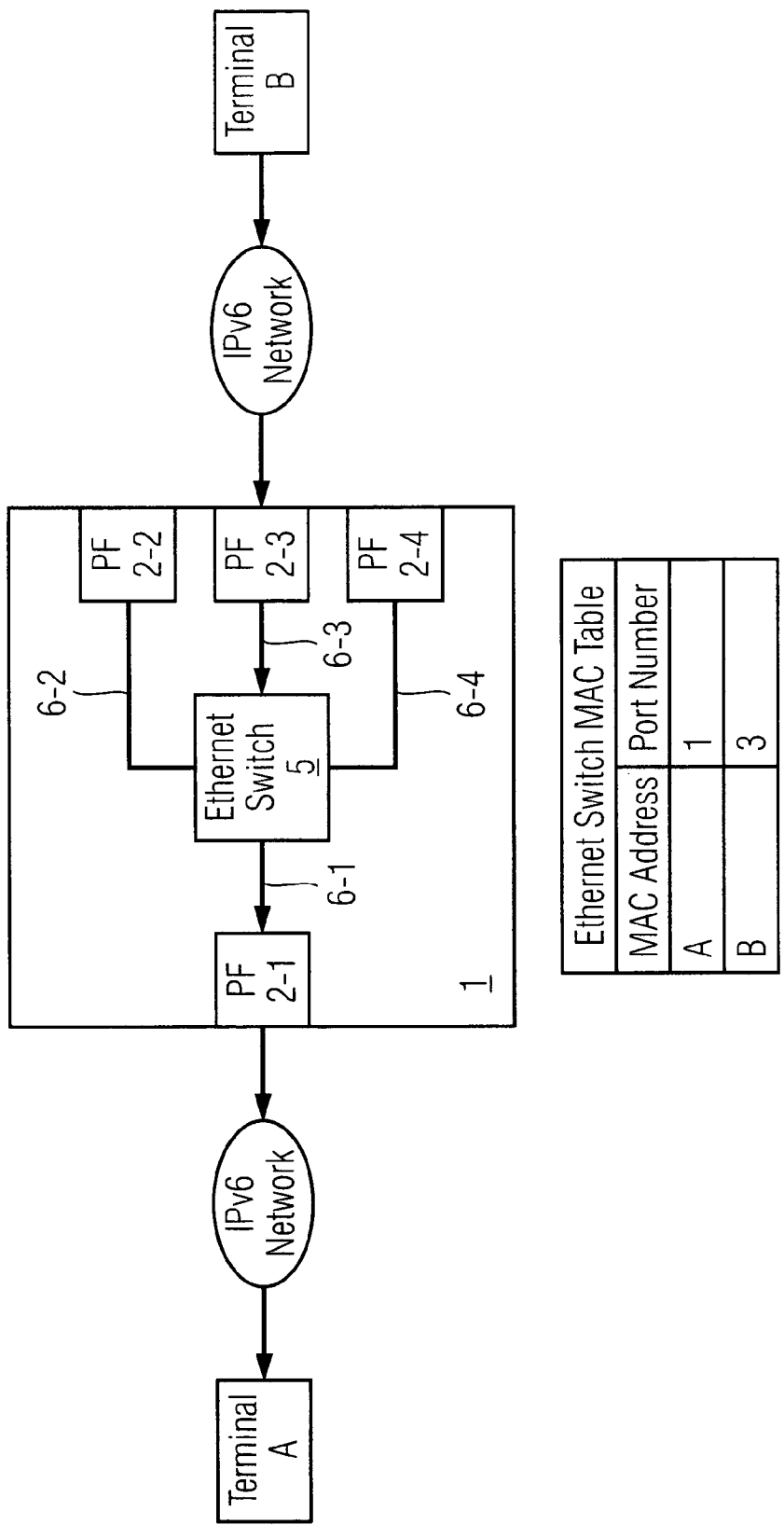

ROUTER IP PORT FOR AN IP ROUTER

CROSS-REFERENCE TO RELATED APPLICATIONS

This application claims the benefit of U.S. patent application 60/567,224 filed Apr. 30, 2004.

FIELD OF THE INVENTION

The present invention relates to a router IP port for an IP router within an IP network system and in particular to a router port foe an IPv6 router.

BACKGROUND

FIG. 1 shows a conventional network connected by routers. Routers use logical and physical addressing to connect two and more logically separate networks. They accomplish connection by organizing the large network into logical network segments which are also called subnetworks or subnets. Each of this subnetworks is given a logical address, allowing the networks to be separate but still access each other and to exchange data when necessary. Data is grouped into packets or blocks of data. Each packet, in addition to having a physical device address, has a logical network address. The network address allows the routers to more accurately and efficiently calculate the optimal path to a workstation or computer. Rooting is provided by a hardware device that operates at the network layer. A router may be an internal device or a stand alone unit that has its own power supply.

Since a router operates at the network layer it is dependent on the protocol being used. The protocol determines the address format in the packets. Thus, an IP (Internet Protocol) router is not able to handle the packets for instance with addresses in X.25 format. A router can work with different data link layer protocols. Multiprotocol routers can handle several data link layer protocols. As a result, a router can be used as a packet filter based on network protocols as well as addresses. Because it is independent of data link layer protocols a router can connect networks using different architectures, for example Ethernet to Token Ring or Ethernet to FDDI.

Several levels of routers can be defined. For example, a particular city might have building-level routers. Each router knows how to find a path from a node in its building to a node in another building. Basically the router has the task of getting a data packet to the router for the destination building. When for instant the building level router receives a packet, the router checks whether it is intended for the building. If so, the router passes it through to the floor for which the packet is intended. If not, the router determines a path to the destination building.

FIG. 2 shows a block diagram of a conventional router according to the state of the art. The router as shown in FIG. 2 is a router for the state of the art internet protocol version 4 (IPv4). The router comprises a routing core which is a hardware device connected to other routers or servers and to terminals or personal computers. The router comprises a memory for storing a routing table and a search engine which searches the routing table for a matching data entry when a new data packet is received by the routing core. A routing table of the router is actualized permanently using routing protocols such as BGP (Border Gateway Protocol) or OSPF (Open Shortest Path First). With the routing protocols the router determines signal paths for packets by communicating with neighboring routers at their level. Routers can request and obtain information about data paths from the neighbor to still other routers. Since routers operate at the network layer they are sensitive to the protocol being used. Thus, a router that can handle IP packets can not handle IPX packets without addition of special capabilities. Single protocol routers were the rule for many years. In the natural course of technological evolution routers expand the capability with respect to the network level protocol supported. High end routers can process packets from more than one type of protocol.

The Ipv4 router according to the state of the art as shown in FIG. 2 has the drawback that the memory for the routing table needs a lot of storing capacity since the routing table to be stored has a lot of data entries. In an Ipv4 network the addition of a new router into the network makes it sometimes necessary to change the routing tables worldwide. The main reason for this is that IPv4 networks are not formed hierarchically. The current internet is based on the internet protocol version 4 (IPv4). The twenty years old IPv4 protocol makes it necessary for routers to store a very huge routing table, typically 100 K to 250 K entries.

The internet protocol version 6 (IPv6) is expected to be the key enabling technology for the next generation internet which allows communication in computing anywhere, at any time in a secure manner. The new features of IPv6 include a large address space with 128 instead of 32 bits source and destination addresses and an efficient hierarchical addressing scheme. IPv6 data packets comprise a simplified header format.

SUMMARY

It is the object of the present invention to provide an IP router for forwarding IP data packets within a hierarchical IP network system such as the IPv6 network system wherein the memory size for storing router information is minimized.

In accordance with one embodiment of the present invention, a router IP port for an IP router of an IP network system, wherein the router IP port comprises:

(a1) an encapsulating unit for encapsulating IP data packets received from an IP sub-network to generate Ethernet data packets which are forwarded to an Ethernet unit of said IP router;

(a2) a decapsulating unit for decapsulating Ethernet data packets received from said Ethernet unit to extract IP data packets to be forwarded;

(a3) an Egress filter unit for filtering the decapsulated IP data packets extracted by said decapsulating unit in response to a match signal which is generated by an Egress comparison unit which compares a hierarchical destination address prefix of said decapsulated IP data packets logically with configuration data stored in a local memory of said router port.

The invention further provides an IP router for forwarding IP data packets within a hierarchical IP network system having a predetermined maximum number ($N_{max}$) of hierarchy levels between IP subnetworks, wherein said IP router comprises:

(a) a number of router ports for connecting the IP router to said IP sub-networks, wherein each router port is identified by a corresponding port number and wherein each router port is connected to a central Ethernet unit;

(b) wherein each router port has:

(b1) an encapsulating unit for encapsulating IP data packets received from an IP sub-network to generate Ethernet data packets which are forwarded to an Ethernet unit;

(b2) a decapsulating unit for decapsulating the Ethernet data packets received from said Ethernet unit to extract decapsulated IP data packets to be forwarded;

(b3) an Egress routing unit for filtering the decapsulated IP data packets extracted by said decapsulating unit in response to an Egress match signal which is generated by an Egress comparison unit which compares a hierarchical destination address prefix of said decapsulated IP data packets logically with configuration data stored in an Egress memory of said router port.

In a preferred embodiment the IP router according to the invention is an IPv6 router for forwarding IPv6 data packets.

In a preferred embodiment the Ethernet unit comprises at least one Ethernet switch.

In a preferred embodiment the IP router according to the present invention comprises further Ethernet ports which are connected to the Ethernet unit.

In a preferred embodiment the IP router comprises a configurable router identification register for storing a predetermined number of router identification data fields to define the hierarchy level of said IP router,
wherein the number of router identification data fields stored in said router identification register is identical to the maximum number of hierarchy levels of the hierarchical IP network system.

In a preferred embodiment each IPv6 data packet has a header including an IPv6 source address comprising a hierarchical source as prefix having a predetermined number of router identification data fields an
a source address suffix including a source MAC address of a source terminal,
an IPv6 destination address comprising the hierarchical destination address prefix having the predetermined number of router identification data fields and
a destination address suffix including a destination MAC address of a destination terminal.

In a preferred embodiment the Ethernet unit has a MAC address memory for storing dynamically in a MAC address table the source MAC address included in an IP data packet last received by a router port together with the port number of the router port.

In a preferred embodiment the Ethernet unit switches an Ethernet data packet received by the Ethernet unit from a router port to another router port which is identified by the port number, when the port number of the other router port is stored is that MAC address table in correspondence to the destination MAC address of the encapsulated Ethernet data packet.

In a preferred embodiment the Ethernet unit switches an Ethernet data packet to all other router ports for decapsulating when no port number is stored in correspondence to the destination MAC address of the encapsulated Ethernet data packet in that MAC address (flooding)

In a preferred embodiment the IP router according to the present invention comprises uplink router ports for linking said IP router to IP routers having higher hierarchy levels.

In a first embodiment the IP router according to the present invention comprises downlink router ports for linking that IP router to IP routers having lower hierarchy levels.

In a preferred embodiment the IP router according to the present invention comprises peerlink router ports for linking said IP router to IP routers having the same hierarchy level.

In a further embodiment the IP router according to the present invention comprises an uplink default router port.

In a preferred embodiment the address prefix of the IP data packet comprises 64 Bit.

In a preferred embodiment the MAC address of the terminal comprises 48 bits.

In a preferred embodiment the IP data packet routed by the IP router according to the present invention is an IPv6 data packet comprising a version data field, a traffic class data field, flow label data field, a data field indicating the length of a payload data field, a data field indicating the next header and a data field indicating a hop limit.

The IP data packet consists of the header and a payload data field.

In a preferred embodiment the IP router according to the present invention comprises an Ingress routing unit which routes the received IP data packets according to a longest prefix match algorithm.

In a preferred embodiment the IP router according to the present invention the port number of a router port and the corresponding MAC address are cancelled after a cancellation default time has passed since reception of the last IP data packet by said router port (aging).

The cancellation default time is programmable in a preferred embodiment.

In a preferred embodiment the Egress memory is a content addressable memory (CAM).

In a preferred embodiment the IP router according to the present invention comprises an Egress filter unit having a
prefix extraction circuit for extracting the destination address prefix from the decapsulated IP data packet,
a destination prefix register for storing the extracted destination address prefix, and
the Egress comparison unit for comparing the port configuration data stored in said Egress memory with the stored destination address prefix.

In a preferred embodiment the Egress comparison unit of said Egress filter unit comprises a number of comparison logic means wherein each comparison logic means is provided for comparing one bit of the destination address prefix stored in the destination prefix register with a corresponding bit of the port configuration data stored in said Egress memory to generate a bit match signal.

In a preferred embodiment the comparison unit of said Egress filter further comprises and AND logic which combines all bit match signals generated by said comparison logic means to generate said Egress match signal.

In a further preferred embodiment of the IP router according to the present invention the Egress filter unit further comprises a configuration logic which combines said Egress match signal generated by said comparison unit with a link configuration bit to generate a demultiplexer control signal.

In a preferred embodiment of the IP router according to the present invention the Egress filter unit has a demultiplexer comprising
an input to receive the IP data packets from the decapsulating unit,
a first output to forward the IP data packets via a link to another IP router or terminal,
a second output to discard the received IP data packets and
a control input for receiving the control signal output by said configuration logic.

In a preferred embodiment the configuration logic is formed by an EXOR logic.

In a preferred embodiment of the IP router according to the present invention the Ingress routing unit comprises
a prefix extraction circuit for extracting the destination address prefix from the decapsulated IP data packets,
a destination prefix register for storing said extracted destination address prefix, and an Ingress comparison unit for comparing configuration data stored in an Ingress port memory with the stored destination address prefix.

In a preferred embodiment of the IP router according to the present invention the Ingress comparison unit of said routing unit comprises a number of comparison logic means, wherein each comparison logic means is provided for comparing one bit of the destination address prefix stored in said destination prefix register with a corresponding bit of said port configuration data stored in said Ingress port memory to generate a bit match signal.

In a preferred embodiment the Ingress comparison unit further comprises an AND logic which combines all bit match signals generated by said comparison logic means to generate an Ingress match signal.

In a preferred embodiment the Ingress memory is a content addressable memory.

In a still further preferred embodiment of the IP router according to the present invention the Ingress routing unit further comprises a counter for generating a count value, wherein the counter is reset by a load signal generated by said prefix extraction circuit when the destination prefix address is loaded into the destination prefix register, wherein the counter is disabled by the Ingress match signal generated by said Ingress comparison unit.

In a preferred embodiment the Ingress routing unit further comprises an address decoder which receives the count value from said counter to generate an internal address for addressing the Ingress memory.

In a preferred embodiment the Ingress memory stores a number of configuration entries including port configuration data and corresponding port numbers.

In a preferred embodiment of the IP router according to the present invention the Ingress routing unit further comprises a latch for latching the port number read out from the Ingress memory in response to the generated internal address, wherein the latch is enabled by said ingress match signal to output the latched port number. In a preferred embodiment the IP router according to the present invention comprises a central control unit which comprises the router configuration register.

In a preferred embodiment the control unit is connected via a configuration bus to the Egress memories and to the Ingress memories of all router ports within the IP router.

In a preferred embodiment the control unit enables or disables the IP router ports according to configuration data stored in the router configuration register.

In a preferred embodiment the port number output by said Ingress routing unit is applied to a local MAC memory connected to the encapsulating unit for retrieving an internal MAC address.

In a preferred embodiment of the IP router according to the present invention the encapsulating unit generates an internal MAC address on the basis of the address suffix included in the header of the IP data packet.

In a preferred embodiment the internal MAC address is generated by copying the address suffix.

In an alternative embodiment the generation of the internal MAC address is performed by means of an internal MAC address generation unit.

In a preferred embodiment the internal MAC address generation unit comprises a source prefix address register for storing the source prefix address of the IP data packet, a generator polynomial register for storing a generator polynomial and a polynomial division unit for dividing the source prefix address stored in said source prefix address register by the generator polynomial stored in said generator polynomial register to generate the internal MAC address and an internal MAC address register for storing said generated internal MAC address.

The operations are performed using modulo 2 operations.

In an alternative embodiment the internal MAC address generation unit comprises a source suffix address register for storing a source suffix address of the IP data packet, a generator polynomial register for storing a generator polynomial, a polynomial division unit for dividing the source suffix address stored in said source suffix address register by the generator polynomial stored in said generator polynomial register, a configurable memory for storing the port number of said router port, and an internal MAC address register for storing the internal MAC address which is composed of the output generated by said polynom division unit and the port number stored in said memory.

In a preferred embodiment each router port of the IP router according to the present invention is formed by an integrated circuit.

The invention further provides a method for routing IP data packets within a hierarchical IP network system comprising the following steps, encapsulating IP data packets received by a first router port of a router to generate Ethernet packets, switching the Ethernet packets to a second router port of said router by means of an Ethernet switch, decapsulating the switched Ethernet data packets in said second router port to extract the received IP data packets, comparing a hierarchical destination address prefix of the extracted IP data packets with port configuration data stored in said second port to generate a match signal, filtering the IP data packets in response to the match signal, and forwarding the filtered IP data packets.

BRIEF DESCRIPTION OF THE DRAWINGS

In the following preferred embodiments of the IPv6 router according to the present invention are described with reference to the enclosed figures.

FIG. 5 shows a preferred embodiment of an Egress TCAM within the router port according to the present invention;

FIG. 13 shows an example for the data content of an Egress port memory defining a downlink of an IPv6 router according to the present invention;

FIG. 14 shows the data content of a local port memory defining a peerlink of an IPv6 router according to the present invention;

FIG. 20 shows the data structure of an address prefix for routing via a downlink port;

FIG. 21 shows the data structure of an address prefix for routing via a peer link port.

FIG. 22 shows the data structure of an address prefix for routing via an uplink port to another router having a one level higher hierarchy level;

FIG. 23 shows the data structure of an address prefix for routing via an uplink port to another router having a three level higher hierarchy level;

FIG. 24a-24k shows a routing example for exchanging IP data packets via an IPv6 router according to the present invention.

DETAILED DESCRIPTION

Figure 1:
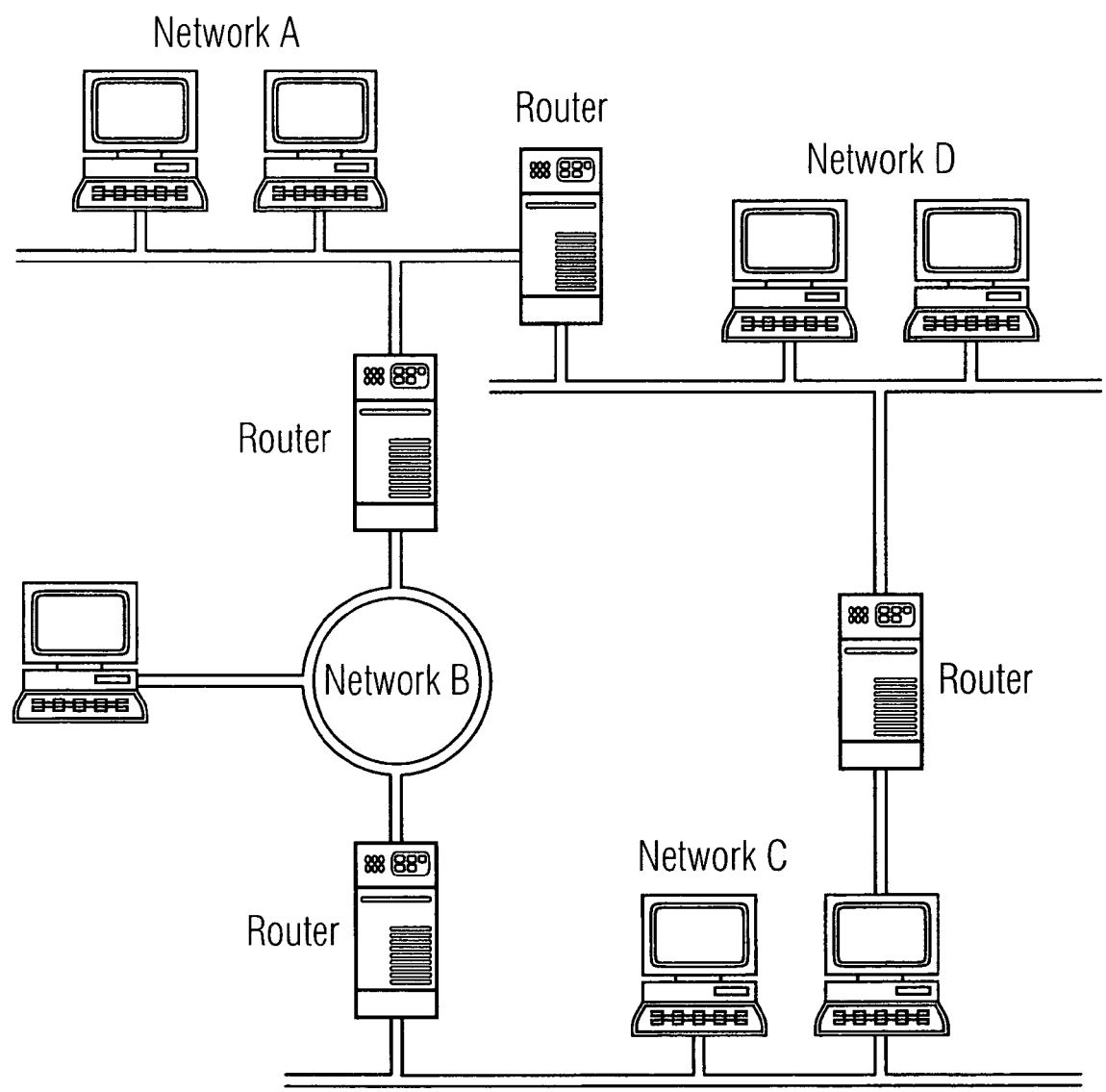
FIG. 1 shows an IP network with conventional routers according to the state of the art.
Figure 2:
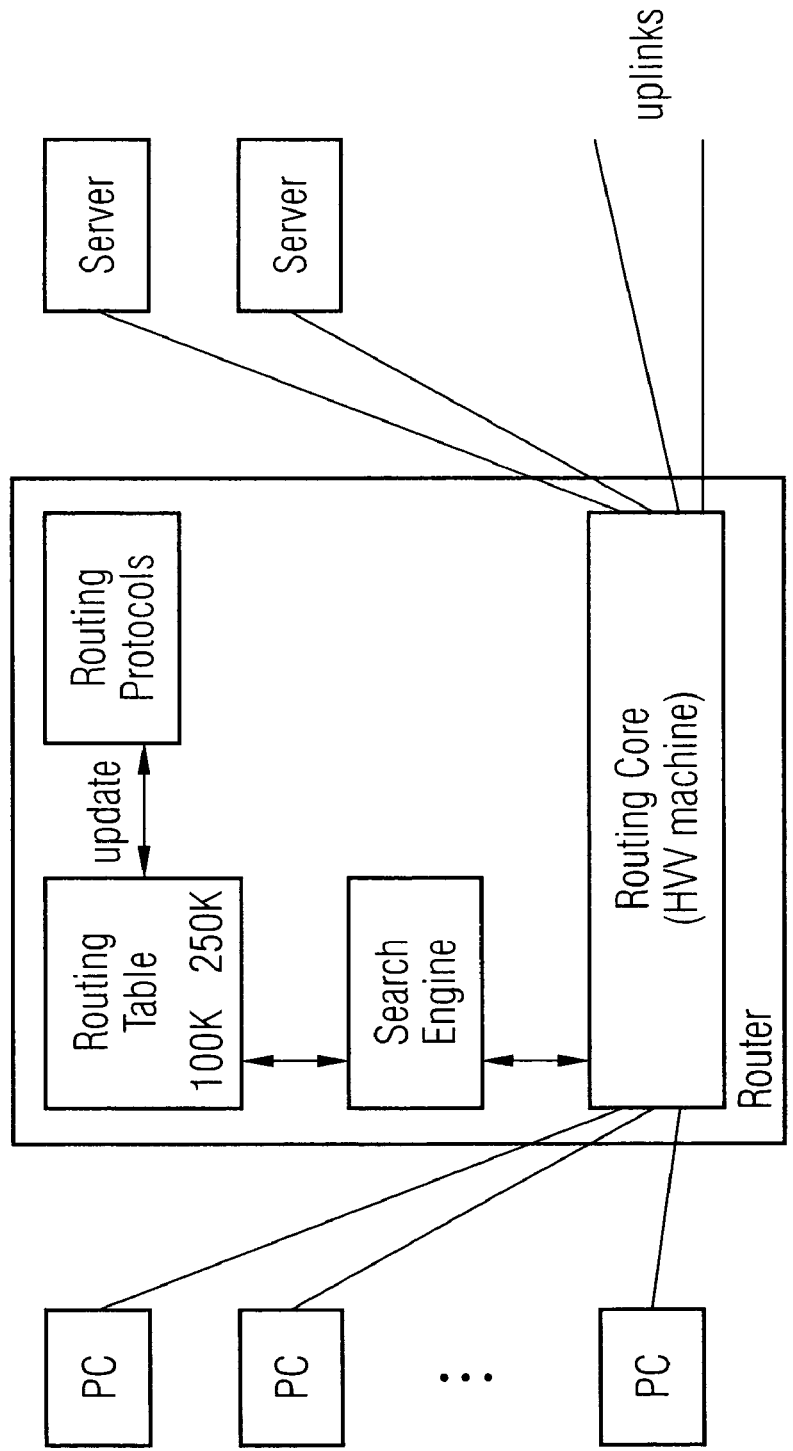
FIG. 2 shows a block diagram of a conventional IPv4 router.
Figure 3:
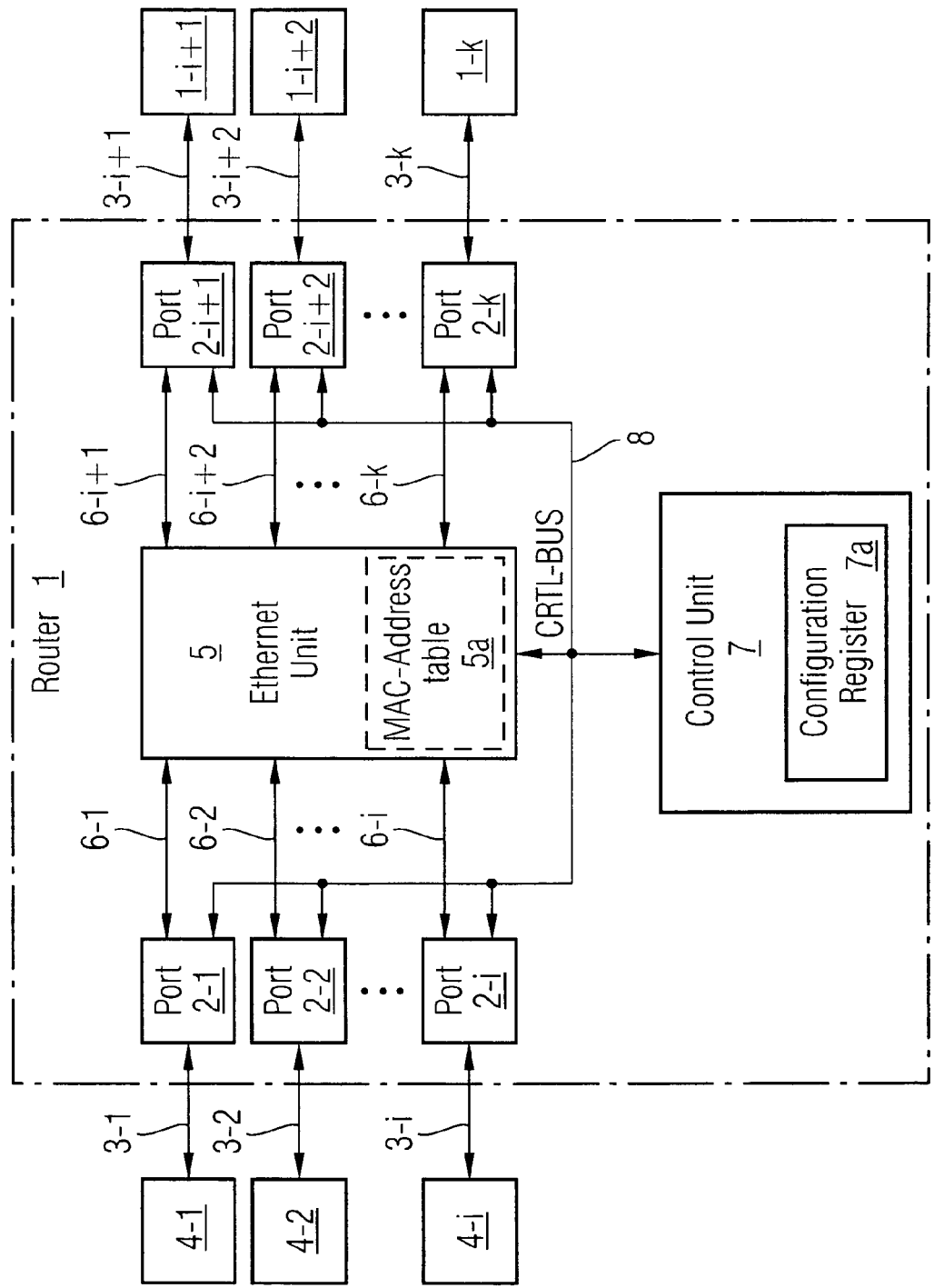
FIG. 3 shows a block diagram of a router according to the present invention.

FIG. 3 shows an IP router 1 according to the present invention for forwarding IP data packets between subnetworks of an hierarchical IP network system such as the internet. The IP router 1, according to the present invention comprises a number of IP ports 2. In the example shown in FIG. 3 the IP router 1 comprises K IP ports. Each IP port 2-$i$ is connectable via a link-data line 3-$i$ to another router or terminal of the hierarchical IP network system. In the example shown in FIG. 3 the IP ports 2-1 to 2-$i$ of the router 1 are connected via data lines 3-1 to 3-$i$ to terminals 4-1 to 4-$i$. The IP ports 2-$i$+1 to 2-$k$ are provided for connecting the IP router 1 as shown in FIG. 1 to further IP routers of the next hierarchy level. A terminal unit 4-$i$ may be formed by personal computer.

Each router port 2 comprises a transceiver for connecting the router via the data line 3 to a remote IP router or terminal. In a preferred embodiment such a transceiver is formed by an xDSL transceiver. In an alternative embodiment the transceiver is formed by ISDN, SDH or Ethernet transceivers.

In a preferred embodiment each router port 2 is integrated in a separated integrated circuit or chip.

In a preferred embodiment the physical data connection between a terminal 4-$i$ and the corresponding IP router port is formed by the telephone line. The terminals 4-$i$ are in a first embodiment stationary and permanently connected to the corresponding IP router port 2-$i$. In an alternative embodiment the terminals 4-$i$ are formed by mobile terminals such as mobile phones. Each mobile terminal is always identified by its home address regardless of its current point of attachment to the internet via the router 1. Accordingly the mobile terminal exchanging IP data packets via the router 1 is always online.

The router 1 according to the present invention comprises further a central Ethernet unit 5 which is connected via internal lines 6 to all IP router ports 2. The Ethernet unit 5 comprises at least one Ethernet switch and a memory 5$a$ for storing an internal MAC address table. The Ethernet unit 5 is connected to a control unit 7 of the IP router 1 via an internal control bus 8. The control unit 7 controls via the control bus 8 further all IP router ports 2 within the router 1. A control unit 7 comprises a configuration register 7$a$ for storing router configuration data. In the embodiment as shown in FIG. 3 the IP router 1 comprises a plurality of IP router ports 2 for exchanging IP data packets with the connected terminals 4-$i$ and the other remote IP routers 1-$i$.

In a further embodiment the router 1 according to the present invention comprises additional Ethernet ports for exchanging Ethernet data packet with Ethernet networks.

Each router port 2 is identified within the router 1 by a corresponding port number and connects a data link 3 of a terminal or of a remote router to the Ethernet unit 5.

Each router port 2 encapsulates an IP data packet received from a connected IP subnetwork or terminal to generate an Ethernet data packet which is forwarded to the Ethernet unit 5 of the IP router 1. Further each router IP port 2 decapsulates an Ethernet data packet received from said Ethernet unit 5 to extract IP data packets which are forwarded to the remote router or terminal. Consequently via the internal data lines 6 Ethernet packets are exchanged between an Ethernet unit 5 and a corresponding Ethernet router port 2. On the data lines 3-$i$ only IP data packets are exchanged between the router 1 and the terminals 4-$i$ or the remote router 1-$i$. The internal data lines 6-$i$ and the external data lines 3-$i$ are used for bidirectional data transmission by means of data packets. The Ethernet unit 5 switches an Ethernet data packet received from a connected router port to another router port which is identified by its port number wherein the port number of the other router port is stored in the MAC address table 5$a$ in correspondence to a destination MAC address of the Ethernet data packet encapsulated by the first router port. The Ethernet unit 5 comprises an Ethernet switch which performs the switching between the router IP ports. In a first embodiment the Ethernet switch is a store and forward switch which checks each Ethernet packet for errors before directing it to the appropriate port. In an alternative embodiment the Ethernet switch is a crosspoint switch which directs the Ethernet packets without checking for errors.

Each router 2 port can be activated or deactivated by the control unit 7 via the control and configuration bus 8 according to the configuration data of the router 1 stored in the configuration register 7$a$. The configuration register 7$a$ is programmable via an interface circuit.

Figure 4:
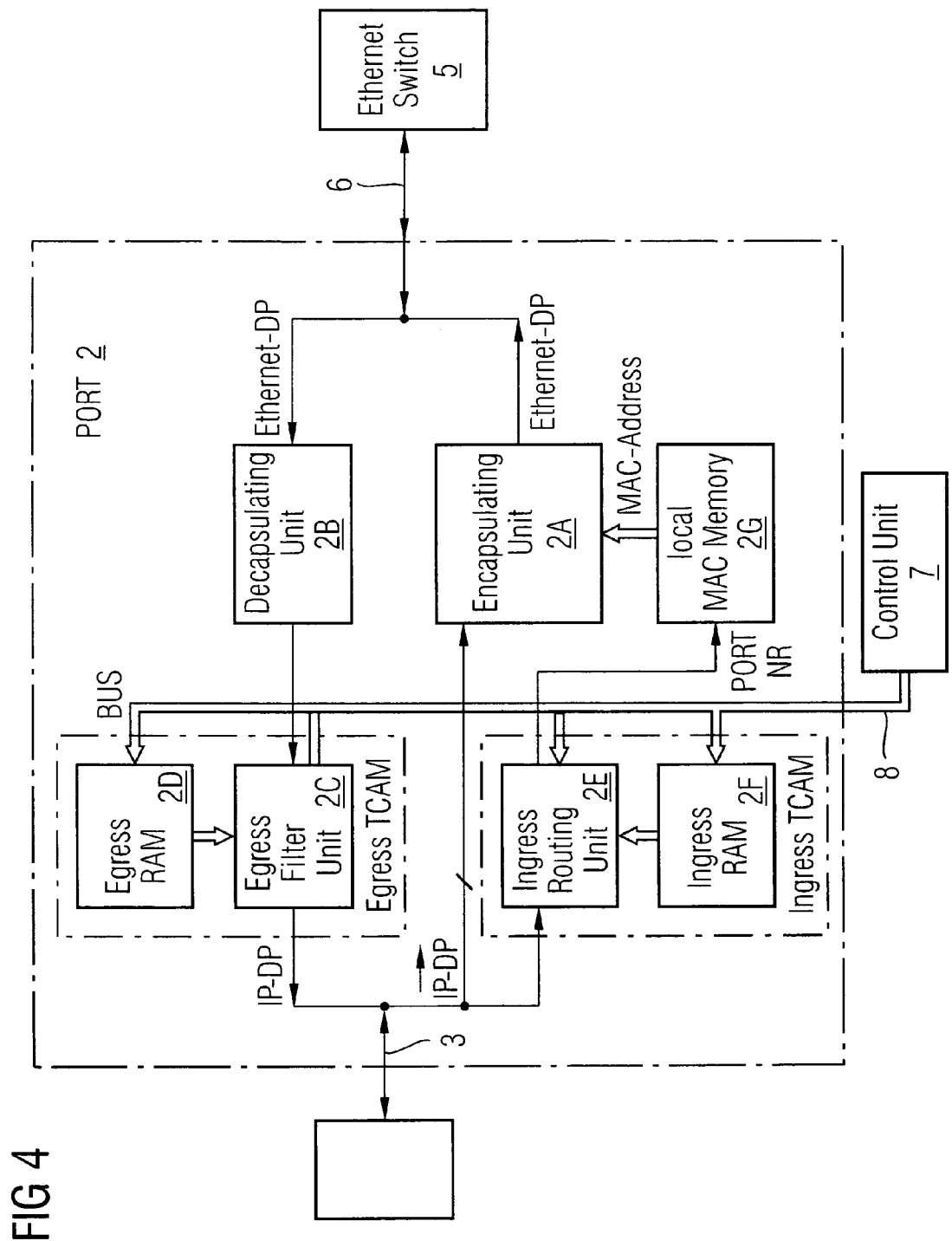
FIG. 4 shows a block diagram of a preferred embodiment of a router port as provided in the IP router according to the present invention.

FIG. 4 shows a preferred embodiment of an IP router port 2 according to the present invention. The IP router port 2 according to the present invention comprises an encapsulating unit 2a for encapsulating IP data packets received from an IP subnetwork via the external data link 3 to generate Ethernet data packets which are forwarded to the Ethernet unit 5 of said IP router 1 via internal data lines 6.

The IP router port 2 according to the present invention further comprises a decapsulating unit 2b for decapsulating Ethernet data packets received from the Ethernet unit 5 to extract IP data packets to be forwarded to the IP subnetwork connected to the IP router port 2. The decapsulating unit 2b is connected on its input side to the Ethernet unit 5 and on its output side via internal data lines to an Egress filter unit 2c. The Egress filter unit 2c is provided for filtering the decapsulated IP data packets extracted by the decapsulating unit 2b. The Egress filter unit 2c forwards the filtered IP data packets via the external data link line 3 to a remote IP router 1 or terminal 4. The Egress filter unit 2c is connected via data lines to a local Egress memory 2D which is formed in a preferred embodiment by a RAM. The local Egress memory 2d is configurable via the internal control bus 8 and stores locally configuration data used by the Egress filter unit 2c for filtering the Ethernet data packets received from the decapsulating unit 2b.

The IP router port 2 according to the present invention further comprises in a preferred embodiment an additional Ingress routing unit 2e which routes the IP data packets received via line 3 from the remote 1 router or terminal 4 according to a longest prefix match algorithm. The Ingress routing unit 2e is connected via data lines to a local Ingress memory 2f which is formed in a preferred embodiment by a RAM. The local Ingress memory 2f is also connected via the configuration bus 8 to the control unit 7. The Ingress routing unit 2e and local Ingress memory 2f form the Ingress TCAM (Ternary Content Addressable Memory) of part 2.

In an alternative embodiment of the IP router port 2 according to the present invention no Ingress TCAM is provided within the port 2. Such a router IP port 2 only includes an Egress filter unit 2c, a encapsulating unit 2A and a decapsulating unit 2B.

The Ingress routing unit 2e generates on the basis of the configuration data stored in the Ingress memory 2f a port number which is applied via an internal line to a local MAC memory 2g to read out an internal MAC address for the encapsulating unit 2a.

FIG. 5 shows a preferred embodiment of an Egress TCAM with an Egress filter unit 2c within the IP router port 2.

Figure 6A:
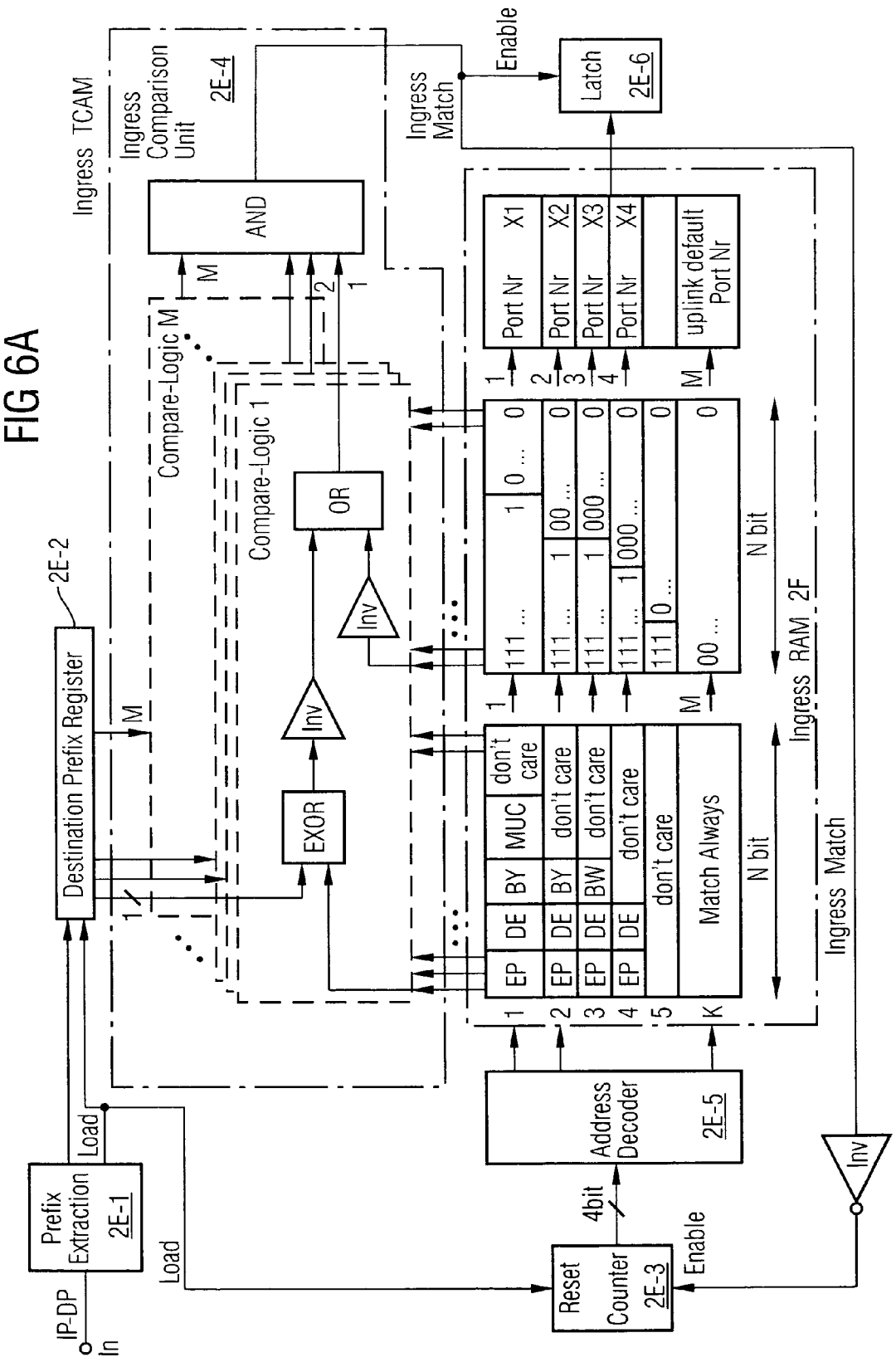
FIG. 6a shows a block diagram of a preferred embodiment of the Ingress TCAM as used in a router port of the IP router according to the present invention.

FIG. 6a shows a preferred embodiment of an Ingress TCAM having a Ingress routing unit 2e within the IP router port 2 according to the present invention.

Figure 7:
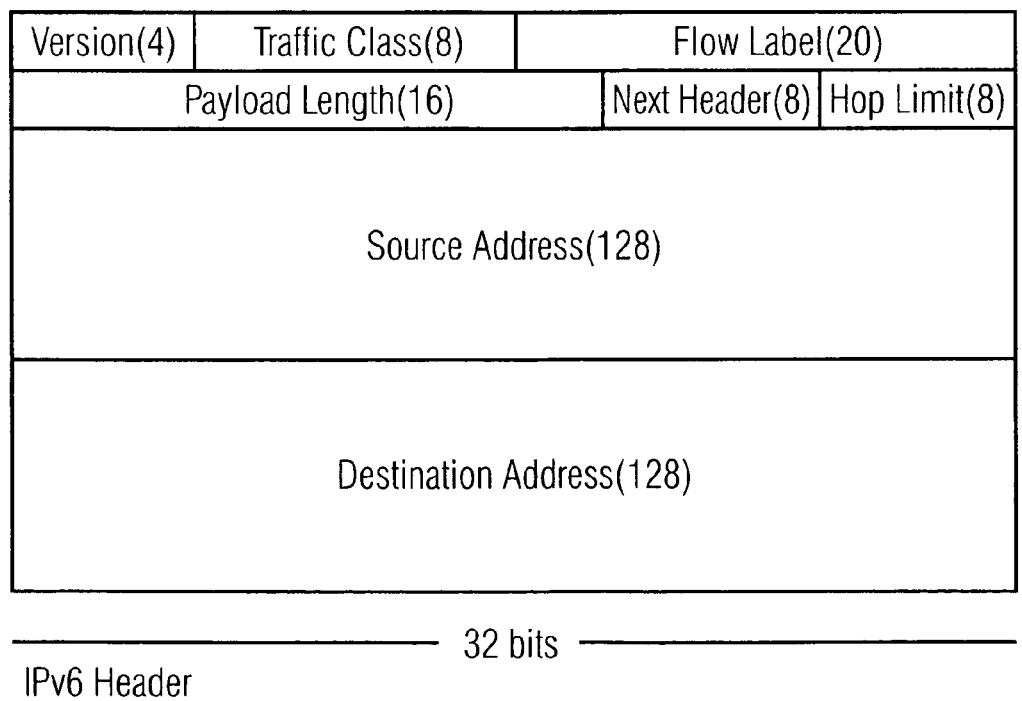
FIG. 7 shows the data structure of a header within an IPv6 data packet.

An IPv6 data packet comprises a header as shown in FIG. 7. A IPv6 header comprises a version data field having four bits indicating that the header is an IPv6 header. The IPv6 header further comprises a traffic class data field, a flow label data field, a data field indicating the length of a payload data field, a data field indicating the next header and a data field indicating a hop limit. The IPv6 header further comprises an IPv6 source address including 128 bits and an IPv6 destination address having also 128 bits. The IPv6 header format as shown in FIG. 7 is simpler than the data format of an IPv4 header. The IPv6 header includes only eight data fields instead of twelve data fields of an IPv4 header. The data size of an IPv6 header comprises forty Bytes. The size of the IPv6 header is fixed. A particular feature of an IPv6 header is that the IPv6 header can be extended by using the next header field which indicates the following extension header. Extension headers of IPv6 data packets are used for packet fragmentation, encryption and authentication. The traffic class data field comprising eight bits is dedicated for the quality of service support. The flow label data field is defined to distinguish IP data packets which need to be treated equally.

Figure 8:
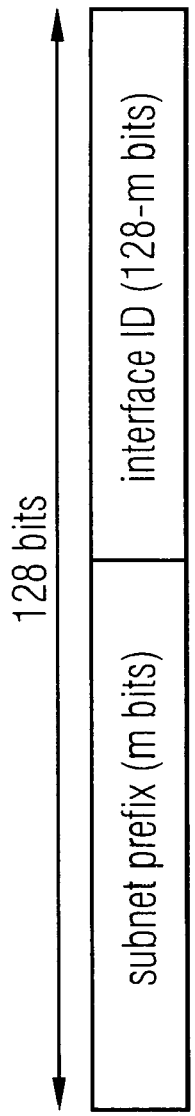
FIG. 8 shows the data structure of an address as employed in an IPv6 network system.

As can be seen from FIG. 7 an IPv6 address within an header is composed of 128 bits. Each IPv6 address comprises an address prefix and an address suffix. FIG. 8 shows an IPv6 address comprising an address prefix of m bits and an address suffix of 128-m bits. The address suffix is also called interface ID address.

The IPv6 address formed in a preferred embodiment by two address parts i.e. a 64 bit address prefix indicating a network and a 64 bit suffix containing terminal information.

The IPv6 address prefix is stable in time. Changes of IPv6 addresses occur in longer time scales than in Ipv4, for example when a subscriber is added or removed from the IP network or if a subscriber changes the network operator. The most important feature of an IPv6 address is that the IPv6 address is structured hierarchically. All IPv6 router networks are structured in hierarchical levels. Changes in one hierarchical level do only affect routers of adjacent hierarchy levels. For example changes at the subscriber level affect the subscriber level itself in case of a new subscriber and affects the next higher hierarchy level in case a prefix contains operator information and the subscriber changes the operator. In a preferred embodiment the IPv6 network is structured according to infrastructure, similar to telephone numbers.

Figure 9:
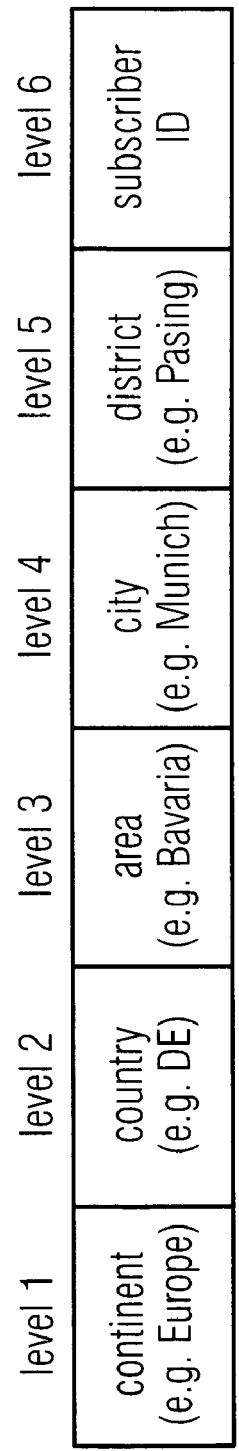
FIG. 9 shows an example for an hierarchically structured IPv6 address as used by the IPv6 router according to the present invention.

FIG. 9 shows an example for an IPv6 address prefix being hierarchically structured. The IPv6 address prefix comprises a predetermined number of router identification data fields. The number of router identification data fields corresponds to the number of hierarchy levels of the IPv6 global network. In the example shown in FIG. 9 the first hierarchy level indicates a continent (e.g. Europe), the second hierarchy level indicates a country (e.g. Germany), the third hierarchy level indicates an area within that country (e.g. Bavaria), the fourth hierarchy level indicates a city within that area (e.g. Munich), the fifth hierarchy level indicates a district within the city (e.g. Pasing), the sixth hierarchy level indicates a subscriber ID of a user located within the district.

The constant header length and the hierarchical header address structure of an IPv6 data packet is used by the IPv6 router 1 according to the present invention to decrease the complexity of the routing hardware devices and in particular to decrease the memory space for the routing tables.

The source address suffix includes an address of a terminal. In a preferred embodiment the address suffix includes a MAC address of a source terminal or a destination terminal. In an alternative embodiment other address formats for indicating terminal are used, e.g. the IMEI address indicating a mobile terminal. The interface ID or address suffix comprising 64 bits include in a preferred embodiment a MAC address having 48 bits. The remaining 16 bits are formed by a predetermined data pattern which identifies the type of the terminal address.

The Egress filter unit 2c within the Egress TCAM of the IP port 2 as shown in FIG. 5 receives from the decapsulating unit 2b a stream of IP data packets which have been decapsulated from Ethernet data packets by means of the decapsulating unit 2b. FIG. 5 shows a preferred embodiment of the Egress filter unit 2c in detail. The Egress filter unit 2c comprises an Egress prefix extraction unit 2-c-1 which is connected to an input (IN) of the Egress filter unit 2c. The input (IN) of the Egress filter unit 2c is connected via internal lines to the decapsulating unit 2b and receives decapsulated IP data packets extracted by said decapsulating unit 2c. Each IP data packet received by the Egress filter unit 2c comprises a hierarchical destination address prefix within the destination address of the IPv6 header as shown in FIG. 7 indicating the destination of this IPv6 data packet. The prefix extraction unit 2c-1 of the Egress filter unit 2c extracts the hierarchical destination address prefix and loads the extracted prefix into a destination prefix register 2c-2 and simultaneously outputs a load signal to reset a counter 2c-3. The Egress filter unit 2c further comprises an Egress comparison unit 2c-4 for comparing port configuration data stored in said Egress memory 2d of the IP router port 2 as shown in FIG. 4. Each IP router port 2 comprises a local Egress memory 2d which is formed by a RAM. The Egress comparison unit 2c-4 forms part of the Egress ternary content addressable memory (TCAM) and comprises M comparison logic means. Each comparison logic means is provided for comparing one bit of the destination address prefix stored in said destination prefix register 2c-2 with a corresponding bit of said port configuration data stored in said Egress memory 2d for generating a bit match signal. The number M of comparison logic means corresponds to the number of bits within the destination address prefix. In a preferred embodiment the Egress comparison unit 2c-3 comprises M=64 comparison logic means.

The Egress RAM 2d is connected via the configuration bus 8 to the control unit 7 and stores locally within the IP port 2 configuration data for identifying the router 1. The Egress memory 2d of the IP port 2 stores locally the configuration data of the router 1 as a data entry and the corresponding mask indicates which router identification data fields are valid.

In the example shown in FIG. 5 the RAM 2d has a data entry with four valid router identification data fields defining the IP router port 2 as a downlink router port 2 within a Bavarian router 1 connecting the Bavarian router 1 having hierarchy level 3 to the remote router 1 of Munich having hierarchy level 4. The corresponding masking bits in the mask TCAM mask away the data bits of the fifth and sixth hierarchy level. The data pattern within the fourth router identification data field are unique and indicate that the remote Munich router 1 is connected via a downlink to the IP router port 2 of the Bavarian router 1. In the example shown in FIG. 5 the Egress filter unit 2c is located within an IP router port 2 of the IP router 1 for Bavaria (BY). When the Egress filter unit 2c receives an IPv6 data packet having a destination address prefix indicating that the IPv6 data packet has to be forwarded via the IP router of Munich all N compare logic means of the Egress comparison unit 2c-4 generate a bit match signal which is logically high. The N bit match signals are supplied to an AND-logic of the Egress comparison unit 2c-4 to generate an Egress match signal. Each comparison logic means within the Egress comparison unit 2c-4 comprises in a preferred embodiment an EXOR-logic comparing a bit of the destination address prefix stored in the destination prefix register with the corresponding bit stored in the RAM 2d of the router port 2. The output of the EXOR-logic is connected via an inverter to an first input of an OR-logic. The other input of the OR-logic is connected to the output of an further inverter inverting the mask bits within the mask TCAM. Each bit match signal output by the OR-logic is connected via an internal line to an input of the AND-logic. The Egress match signal at the output side of the AND-logic is high when all not masked router identification data bits stored in the RAM 2d do match with the corresponding bits of the destination address prefix stored in the destination address prefix register 2c-2. The generated Egress match signal indicating a match is output by the Egress comparison unit 2c-3 to an EXOR-logic 2c-7 of the Egress filter unit 2c. The EXOR-logic 2c-7 combines the Egress match bit with a configuration bit. In a preferred embodiment the configuration bit for the Egress filter unit 2c is set by the control unit 7 via the configuration bus 8. When the configuration bit is logical low (0) the Egress filter unit 2c forms part of a normal IP router port 2. If the configuration bit of the IP router port 2 is set logical high (1) the IP router port 2 is a default uplink router port. The output of the EXOR-logic 2c-7 is connected via a control line to a control input of a demultiplexer 2c-6. The demultiplexer 2c-6 receives at its input the IPv6 data packets supplied to the input (IN) of the Egress filter unit 2c. If the EXOR-logic 2c-7 outputs a logical high control signal the received IP data packets are forwarded by the demultiplexer 2c-6 to an output terminal (OUT) of the Egress filter unit 2c which is connected to the external data line 3. In contrast if the EXOR-logic 2c-7 outputs a logically low control signal the received IP data packets are discarded by the demultiplexer 2c-6. In the embodiment in FIG. 5 the first output of the demultiplexer 2c-6 is connected to the output terminal (OUT) of the Egress filter unit 2c and the second output of the demultiplexer 2c-6 is connected via line to ground. The Egress filter unit 2c as shown in FIG. 5 filters the decapsulated IP data packets extracted by the decapsulating unit 2b in response to the Egress match signal generated by the Egress comparison unit 2c-4. The Egress comparison unit 2c-4 compares the hierarchical destination address prefix of the decapsulated IP data packet with the configuration data stored in the local memory 2d of the router port 2. The local Egress memory 2d is configurable and has only a very small storage capacity. The technical complexity of the Egress filter unit 2c is comparatively low so that the Egress filter unit 2c occupies only a small area when integrated into an integrated circuit. In a preferred the ternary content addressable memory comprising the Egress filter unit 2c has a storage capacity for K entries wherein K corresponds to the number of IPv6 ports within the IP router 1. The Egress memory 2d is formed in a preferred embodiment by a small random access memory RAM.

FIG. 6a shows a preferred embodiment of the Ingress routing unit 2e within the IP port 2 as shown in FIG. 4. The provision of an Ingress routing unit 2e within an IP router port 2 is optional but increases the performance of the IP router 1 according to the present invention.

In Ingress routing unit 2e within the Ingress TCAM comprises a prefix extraction unit 2e-1 for extracting the destination address prefix from the IP data packets received via the external link data lines 3. The received IP data packets are received from a remote IP router 1 or a terminal device 4. The extracted destination address prefix is stored into a destination prefix register 2e-2 when the prefix extraction circuit 2e-1 has extracted the address prefix and generates a load control signal. The load control signal resets a counter 2e-3 within the ingress routing unit 2e. The ingress routing unit 2e further comprises an Ingress comparison unit 2e-4. The Ingress comparison unit 2e-4 is formed in a preferred embodiment identical to the Ingress comparison unit 2c-3 as shown in FIG. 5. The Ingress comparison unit 2e-4 compares the configuration data stored in the Ingress port memory 2f with the stored destination address prefix. The local Ingress port memory 2f is formed in a preferred embodiment by a RAM which is addressed by means of an address decoder 2e-5 of the Ingress routing unit 2e. The number M of comparison logic means within the Ingress comparison unit 2e-4 corresponds to the number of bits of a destination address prefix. Each comparison logic means compares one bit of the destination address prefix stored in said destination address prefix register 2e-2 with the corresponding bit of the port configuration data stored in the Ingress port memory 2f to generate a bit match signal which is supplied to the AND-logic. The AND-logic generates a global Ingress match signal. When the Ingress match signal becomes logical high it disables the counter 2e-3 and enables a latch unit 2e-6 to read out a port number stored in the Ingress TCAM 2f. The counter 2e-3 which is reset by the prefix extraction circuit 2e-1 when the destination address prefix is loaded into the destination prefix register 2e-2 and generates a cyclical count value of e.g. four bits which is decoded by a address decoder 2e-5 to address e.g. K=16 data entries within the RAM 2f of the Ingress TCAM. As long as the Ingress comparison unit 2e-4 does not detect that the destination address prefix stored in the destination prefix register 2e-2 does match with any entry in the Ingress memory 2f the counter generates a count value in a cyclical manner. When the Ingress comparison unit 2e-4 detects a match the corresponding port number is read out from the Ingress memory 2f and output by the enabled latch circuit 2e-6 to the local MAC memory 2g connected to the encapsulating unit 2a as shown in FIG. 4. At the same time the counter 2e-3 is disabled.

In the example shown in FIG. 6 the Ingress routing unit 2g is located within a router port 2 of an IPv6 router 1 for Bavaria (BY). When the Ingress routing unit 2e detects a match with the first entry stored in the Ingress memory 2f as shown the port number x1 of another router port 2 within the IP router 1 is output to the latch unit 2e-6 wherein this port is a downlink port connecting the Bavarian router to the remote router 1 of Munich (MUC). If a match is indicated by the Ingress comparison unit 2e-4 with the second data entry in the Ingress memory 2f as shown the received IP data packet includes a data message for the Bavarian IP router 1 itself. If a match is detected for the third of the shown example entry the Ingress routing unit 2e outputs a port number x3 another router port connected to a remote IP router. When the Ingress comparison unit 2e-4 detects a match between the destination address prefix and the third entry the Ingress Unit 2d outputs a port number x3 of another port 2 connecting the IP router 1 to another IP router 1 of the same hierarchy level via a peer-to-peer link. In the example shown in FIG. 6 the peer-to-peer link connects the Bavarian router (BY) to the router of Baden-Württemberg (BW) wherein the Bavarian router (BY) and the router of Baden-Württemberg has the same hierarchy level in the global IPv6 network.

When the Ingress comparison unit 2e-4 detects a match with the fourth entry of the Ingress memory 2f the port number x4 of the uplink port 2 which connects the IP router 1 to another remote remoter of a higher hierarchy level. In the example shown in FIG. 6 the port number connect in the IP router to the German IP router (DE) is output by the enabled latch 2e-6 to the local MAC memory 2g as shown in FIG. 4.

In a preferred embodiment it is also possible to forward received IP data packets by means of the IPv6 router 1 to remote IP routers 1 of higher hierarchy levels and not only to the next higher hierarchy level. In the example as shown in FIG. 6 when the Ingress comparison unit 2e-4 detects a match with the fifth entry of the Ingress content addressable memory 2f the port number is output indicating a port connecting the IP router 1 to the IP router of Europe (EP) having a two level higher hierarchy level.

Figure 6B:
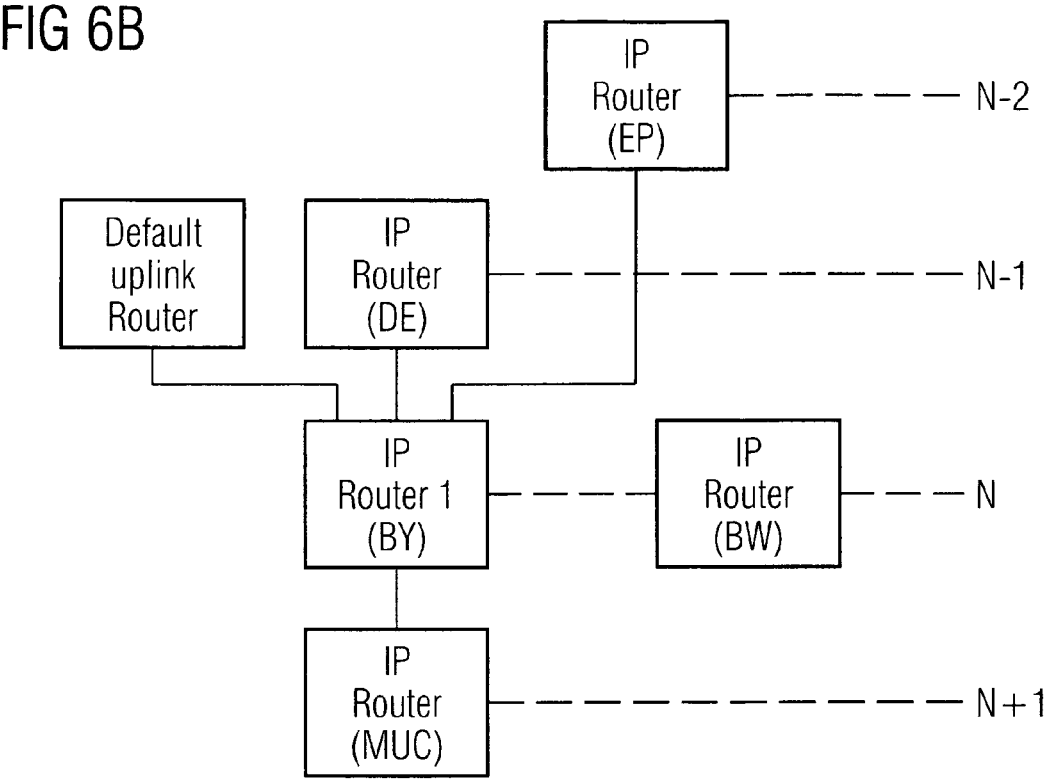
FIG. 6b shows a exemplary hierarchical network system.

FIG. 6b shows the network topology for the example shown in FIG. 6a. The Ingress routing unit 2e within the IPv6 router 1 has an Ingress local memory 2f with e.g. six data entries. The IPv6 router comprises M IP router ports 2. Every IP router port 2 within the IP router 1 has an Ingress routing unit 2e connected to a local Ingress memory 2f wherein the configuration data as shown in FIG. 6a is stored. The IP router 1 is handling IP data packets for Bavaria (BY) and has a first uplink port 2 connecting the IP router 1 for Bavaria to the remote IP router for Germany (DE) of the next higher hierarchy level N-1. A further uplink port 2 for the Bavarian router 1 connects the Bavarian router to the IP router for Europe, i.e. a router having a hierarchy level N-2 which is higher by two levels than the level N of the Bavarian IP router 1 as shown in FIG. 6b. Further the IP router 1 for Bavaria is connected via a peer-to-peer link to the remote IP router 1 of Baden-Württemberg having the same hierarchy level N. The peer-to-peer link is activated by the control unit 7 in a preferred embodiment in response to a activation control signal. Further the IP router 1 for Bavaria is connected via a downlink port to the remote IP router 1 for Munich having the next lower hierarchy level (N+1).

When the Ingress comparison unit 2e-4 doesn't find any match in the local Ingress memory 2f the port number of an uplink default port is read out from the Ingress memory 2f indicating the port number connecting the IP router 1 to an default uplink router of a higher hierarchy level. The match-always entry in the local Ingress memory 2f as shown in FIG. 6a works like an emergency brake. When no destination port can be identified the port number connecting the IP router 1 to the remote uplink router 1 is retrieved from the Ingress RAM 2f. The Ingress routing unit 2e performs a preemptive routing. The optional additional Ingress routing unit 2e reduces the numbers of flooding events within the IP router 1 and increases the performance of the IP router 1 according to the present invention. The Ingress routing unit 2e takes the match with the longest prefix according to a longest prefix match algorithm. The destination address prefix is compared sequentially with its series of configuration entries which are arranged in such a way that longer entries are compared first. With the first match the sequential search stops and the corresponding output port number is read out from the Ingress memory 2f. The first entry in the Ingress local memory 2f is the router ID. If a match is detected with this entry the IP data packet is destined to a downlink port. If a match with a later entry is detected by the Ingress comparison unit 2e-4 the respective uplink port is found together with its MAC address by addressing the local MAC memory 2g of the IP router port 2. The last data entry in the Ingress memory 2f is configured so that a match is always indicated. This data entry defines the default uplink port.

In contrast to the Egress filter unit 2c which is mandatory the provision of an Ingress unit 2e within the IP router port 2 according to the present invention is optional. The Egress routing unit 2c is mandatory and accepts only source IP data packets which are destined to the respective router port 2. The ternary CAM (TCAM) comprises a RAM 2d connected to the Egress filter unit 2c which holds the respective address prefixes. If not entry matches the data entry in the RAM 2d the received IP data packet is discarded by the express filter unit 2e.

The optional Ingress routing unit 2d is provided for identification of IP data packets destined to uplink ports. The respective prefixes are stored in the Ingress local memory 2f. The port number of the longest matching prefix is forwarded to the local MAC memory 2g for reading out a MAC address used by the encapsulating unit 2a to address the MAC table within the Ethernet switching unit 5 of the IP router 1.

Figure 10:
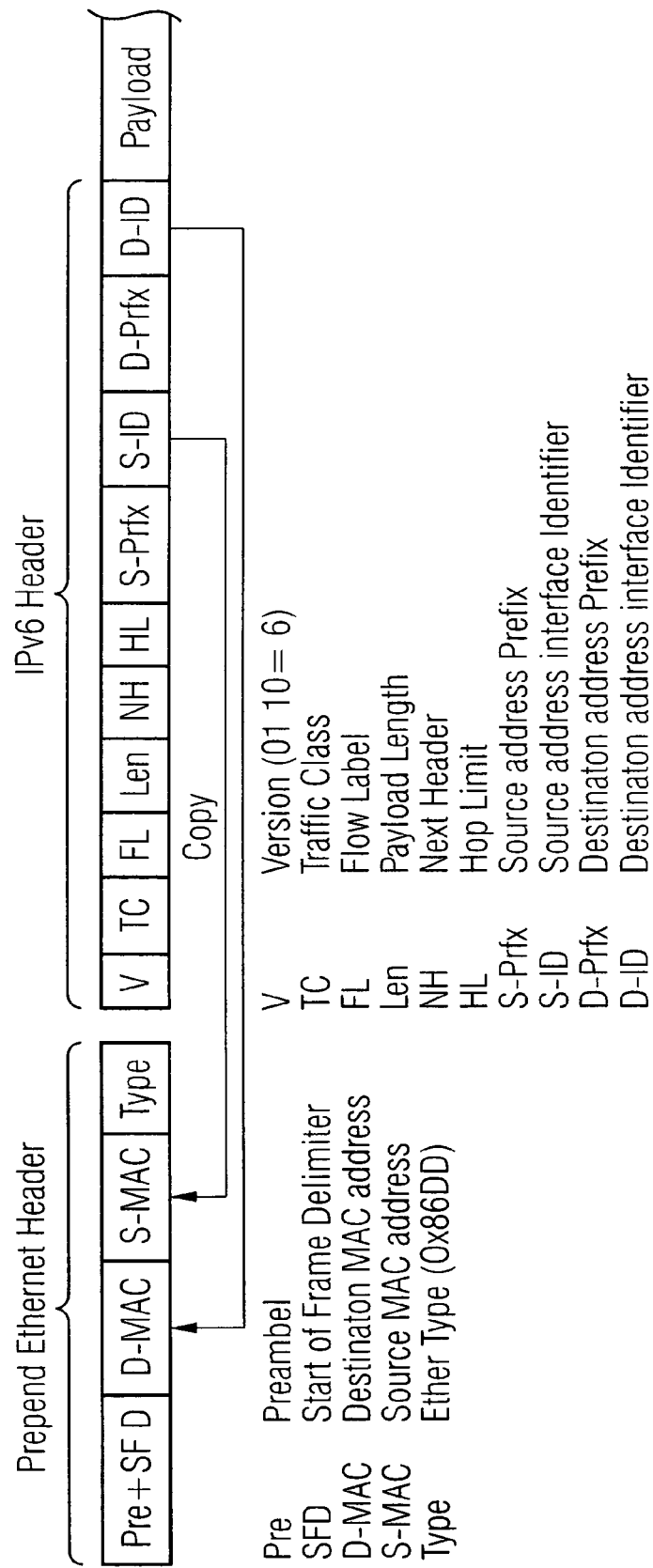
FIG. 10 illustrates the encapsulation of an IPv6 data packet within an Ethernet packet performed by the encapsulating unit within the IPv6 router according to the present invention.

FIG. 10 shows the encapsulation performed by an encapsulating unit 2a when receiving an IP data packet. A source address suffix (source address interface identifier) is copied by the encapsulating unit 2a to the destination MAC address data field of an Ethernet header. In the same manner the destination address suffix (destination address interface identifier) is copied by the encapsulating unit 2a into the destination MAC address data field of the Ethernet header. The destination address prefix (D-PRFX) is supplied to the Ingress routing unit 2e to retrieve the port number for IP data packets destined to an uplink port wherein the internal MAC address of this port 2 is read out from the local MAC memory 2e connected to the encapsulating unit 2a.

Figure 11:
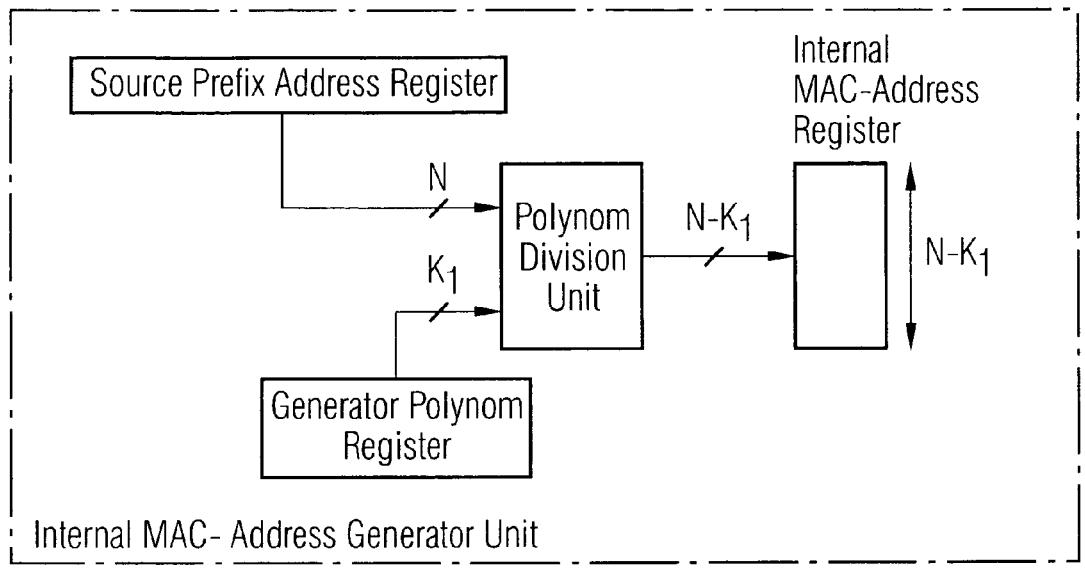
FIG. 11 shows a block diagram of an internal MAC address generation unit according to a first embodiment.

In an alternative embodiment the internal MAC address for encapsulation is an Ethernet is not generated by copying interface identifiers as shown in FIG. 10 but by means of an internal MAC address generation unit as shown in FIG. 11. In the embodiment shown in FIG. 11 the internal MAC address generation unit comprises a source prefix address register for storing the source prefix address of the IP data packet. In a generator polynomial register a generator polynomial is stored. In a preferred embodiment the generator polynomial is programmable. A polynomial division unit is provided for dividing the source prefix address stored in the source prefix address register by the generator polynomial stored in the generator polynomial register. The polynomial division unit generates an internal MAC address which is stored in an internal MAC address register of the MAC address generation unit.

Figure 12:
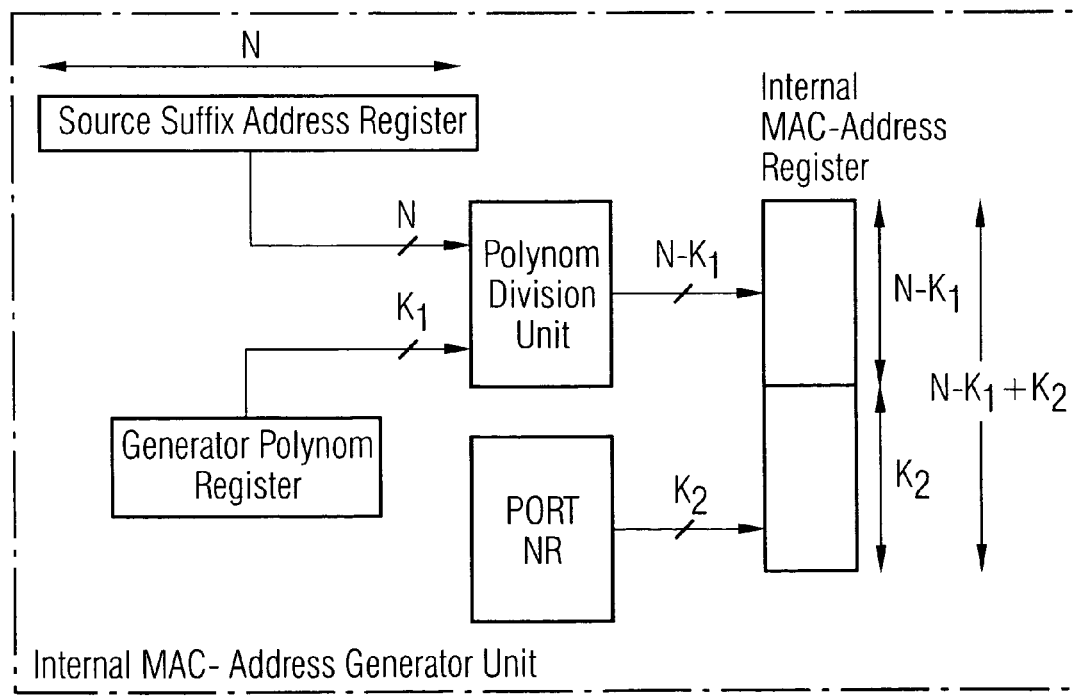
FIG. 12 shows a block diagram of an internal MAC address generation unit within an IP router according to the present invention according to a second embodiment.

FIG. 12 shown an alternative embodiment for an internal MAC address generation unit. The internal MAC address generation unit as shown in FIG. 12 comprises a source suffix address register for storing a suffix address of the received IP data packet. A polynomial division unit divides the source suffix address stored in the source suffix address register by a generator polynomial stored in a generator polynomial register. The internal MAC address consists of the output of the polynomial division unit and the port number of the router port 2 stored in a configurable memory.

FIG. 13 shows an example of a data entry within the Egress local memory 2d for a downlink port 2 within an IP router 1 being the Bavarian (BY) router. The downlink port 2 of the Bavarian router connects the Bavarian router 1 to the remote router 1 for Munich (MUC).

FIG. 14 shows the data entry for a peer link port 2 connecting the Bavarian IP router 1 via a peer link to the IP router 1 of Baden-Württemberg having the same hierarchy level (N) as the Bavarian router.

Figure 15:
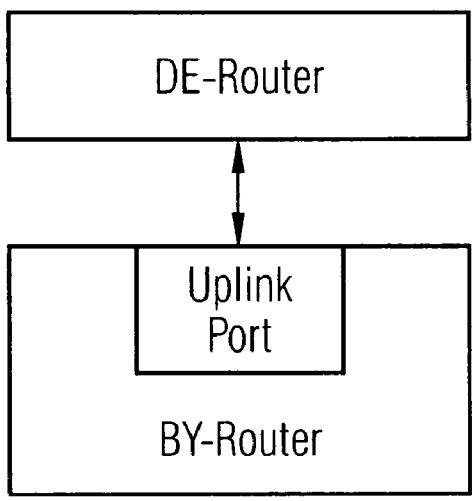
FIG. 15 shows the data content of a local port memory of the IPv6 router according to the present invention defining an uplink of said IPv6 router.

FIG. 15 shows the data entry for an uplink port connecting the Bavarian router 1 to the German (DE) router 1 having the next higher hierarchy level (N−1).

Figure 16:
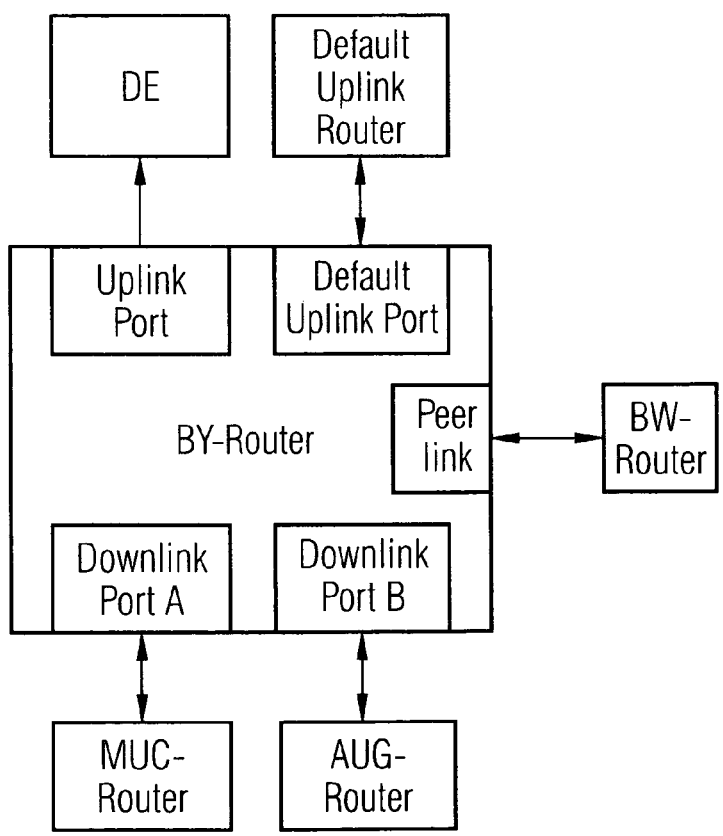
FIG. 16 shows the data content of a local port memory of the IPv6 router according to the present invention for configuration of said port as an default uplink port.

FIG. 16 shows the data entry in an Egress local memory of an default uplink port connecting the Bavarian router 1 with an default uplink router.

Figure 17:
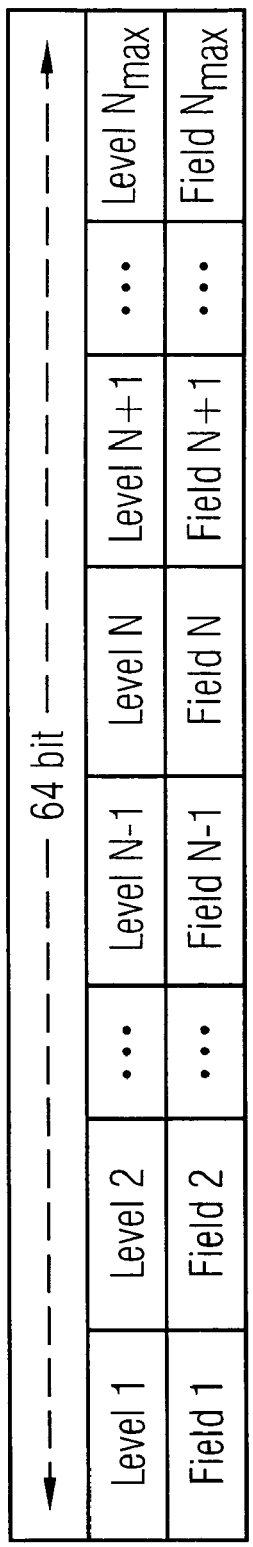
FIG. 17 shows a data structure of a hierarchical structured IPv6 address prefix as employed by the IPv6 router according to the present invention.

FIG. 17 shows a hierarchical address prefix of an IPv6 network comprising 64 bit and defining $N_{max}$ router identification data fields for the IPv6 network system having $N_{max}$ hierarchy levels. Each router identification data field has a bit width of more than one bit typically between four and sixteen bits.

Figure 18:
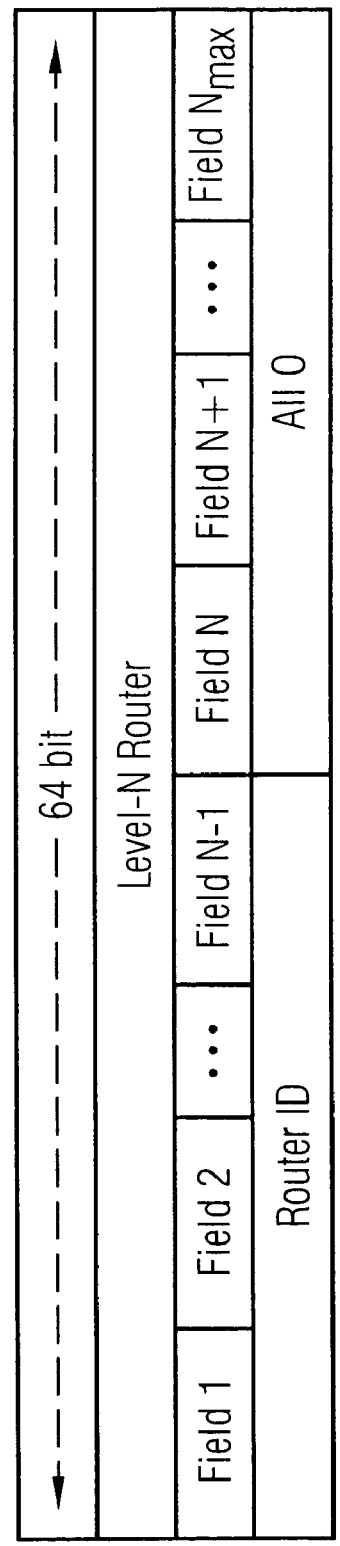
FIG. 18 shows a data pattern for addressing an IPv6 router of level N.

FIG. 18 shows the address prefix within an IP data packet which is destined for an IPv6 router of level N.

The router of hierarchy level 1 is also called top level router. The lowest level router is the home gateway for a subscriber ID.

Figure 19:
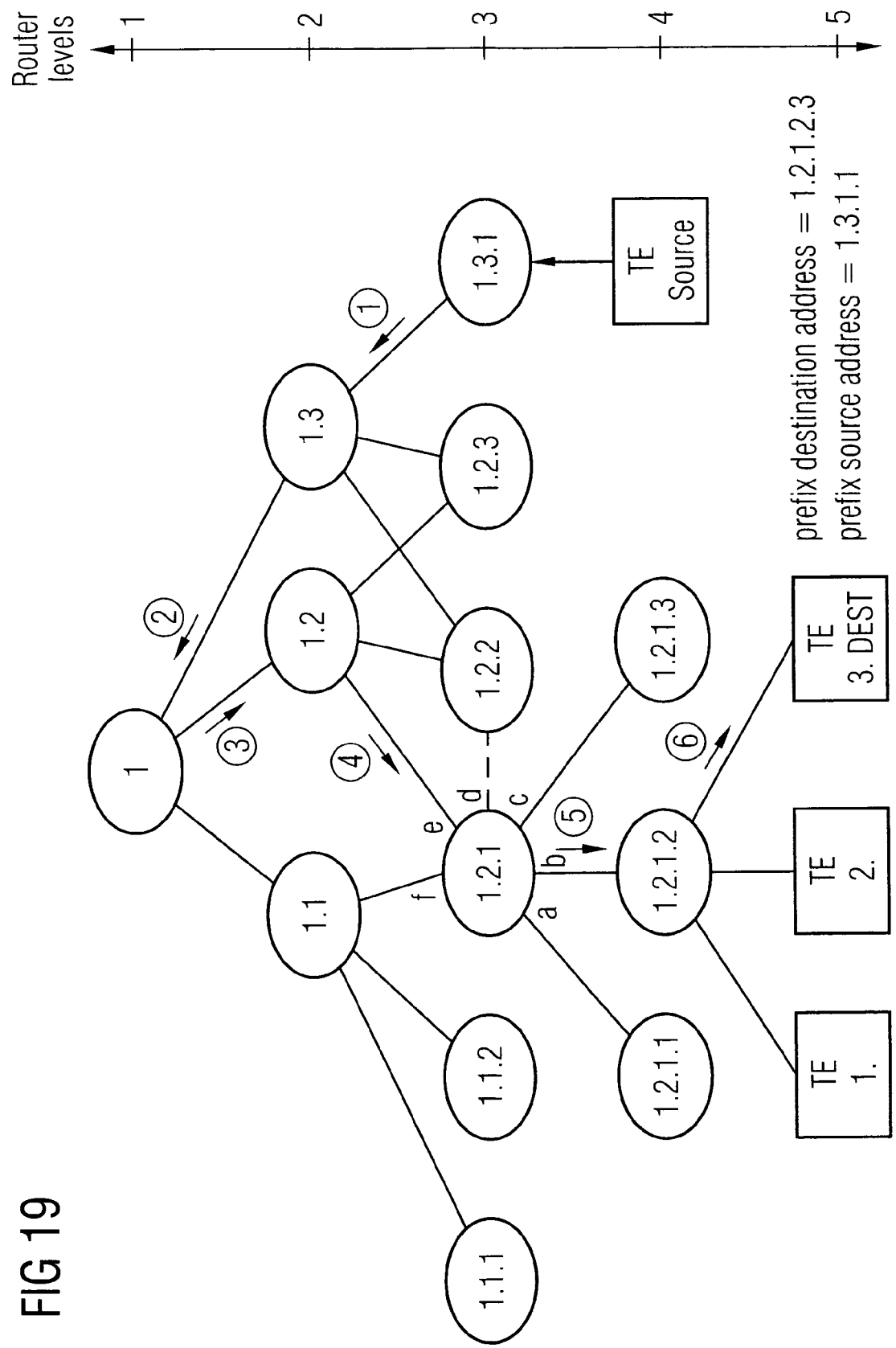
FIG. 19 shows a diagram showing an hierarchical IPv6 network system comprising a plurality of IPv6 routers according to the present invention for forwarding IP data packets from a source terminal to a destination terminal.

FIG. 19 shows an example for one hierarchical IP network having five hierarchy levels. The IP router 1.2.1 in the shown example comprises a default uplink to router 1.2 (port e), a normal uplink to router 1.1 (port f), a redundant (standby) peer link to router 1.2.2 (port d) and three downlink ports (a, b, c) connecting the router 1.2.1 to three IP routers having a lower hierarchy level (N=4).

For instance a source terminal connected to router 1.3.1 sending an IP data packet to the third termination device connected to router 1.2.1.2 sends the IP data packet first to IP router 1.3 which forwards the received IP data packet to the top level router 1. From there the IP data packet is forwarded via IP router 1.2 to IP router 1.2.1 and from there via the downlink port B to router 1.2.1.2 which sends the IP data packet finally to the third destination terminal.

In the shown example the prefix destination address of the IP data packet transmitted by the source terminal is:
Prefix destination address=1.2.1.2.3.
Prefix source address=1.3.1.1.

FIG. 20 shows a data entry into an Egress local memory for routing data packets received by an IPv6 router 1 of hierarchy level N to a downlink port.

FIG. 21 shows the routing of a received IPv6 data packet to a peerlink port.

FIG. 22 shows the data entry in an Egress local memory 2d for routing IP data packets via an uplink port to a remote router 1 having a hierarchy level which is one level higher (N−1) than the hierarchy level (N) of the IP router 1.

FIG. 23 shows the data entry in an Egress local memory 2d for routing IP data packets via an uplink port to a remote router 1 having a hierarchy level (N−3) which is three levels higher than the hierarchy level (N) of the routing IP router 1.

FIG. 24a to 24k shows a routing example for sending an IP packet from a terminal A to a terminal B and for resending an IPv6 data packet from the terminal B back to terminal A.

The terminal A is connected via line 3-1 to a first router port 2-1 and the other terminal B is connected via lines 3-3 to a third router port 2-3 of the IP router 1.

The IPv6 data packet sent from the terminal A to the terminal B has a destination address which is composed of a prefix address B and a suffix address MAC B.

The source address of the sent IPv6 data packet has an address prefix A and an address suffix MAC A.

Figure 24B:
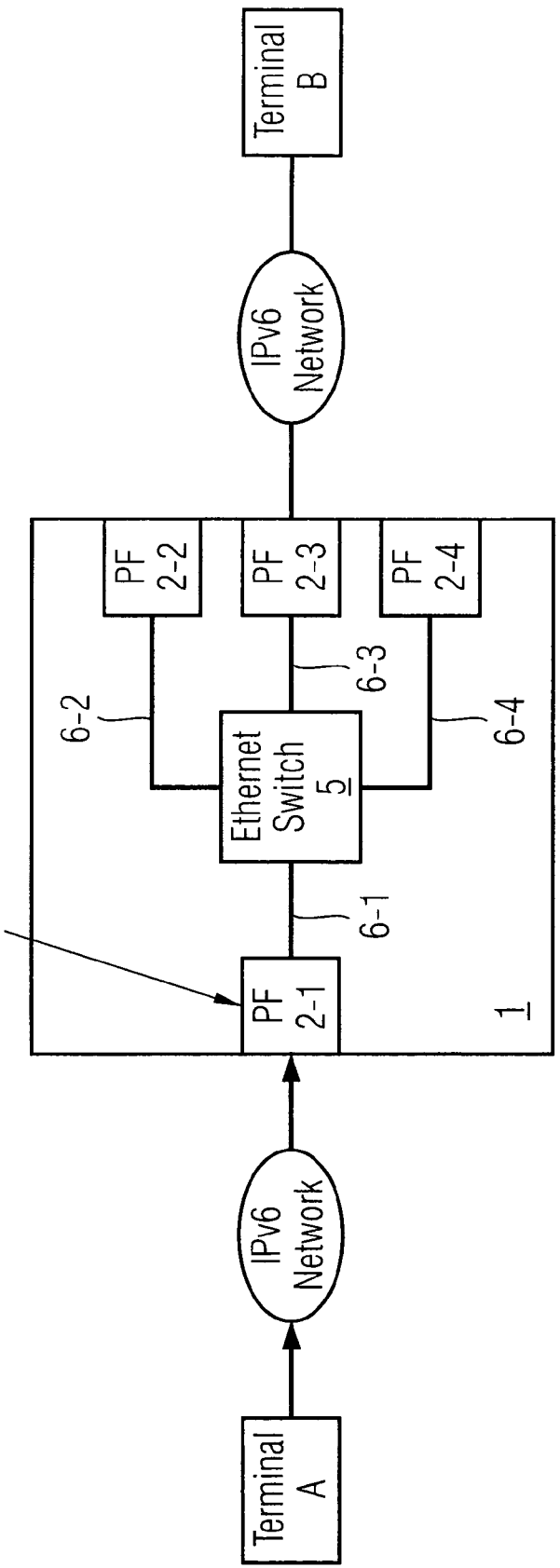

As shown in FIG. 24b port 2-1 encapsulates the received IP data packet to generate an Ethernet data packet by adding an Ethernet header with destination address=MAC B and source address=MAC A.

Figure 24E:
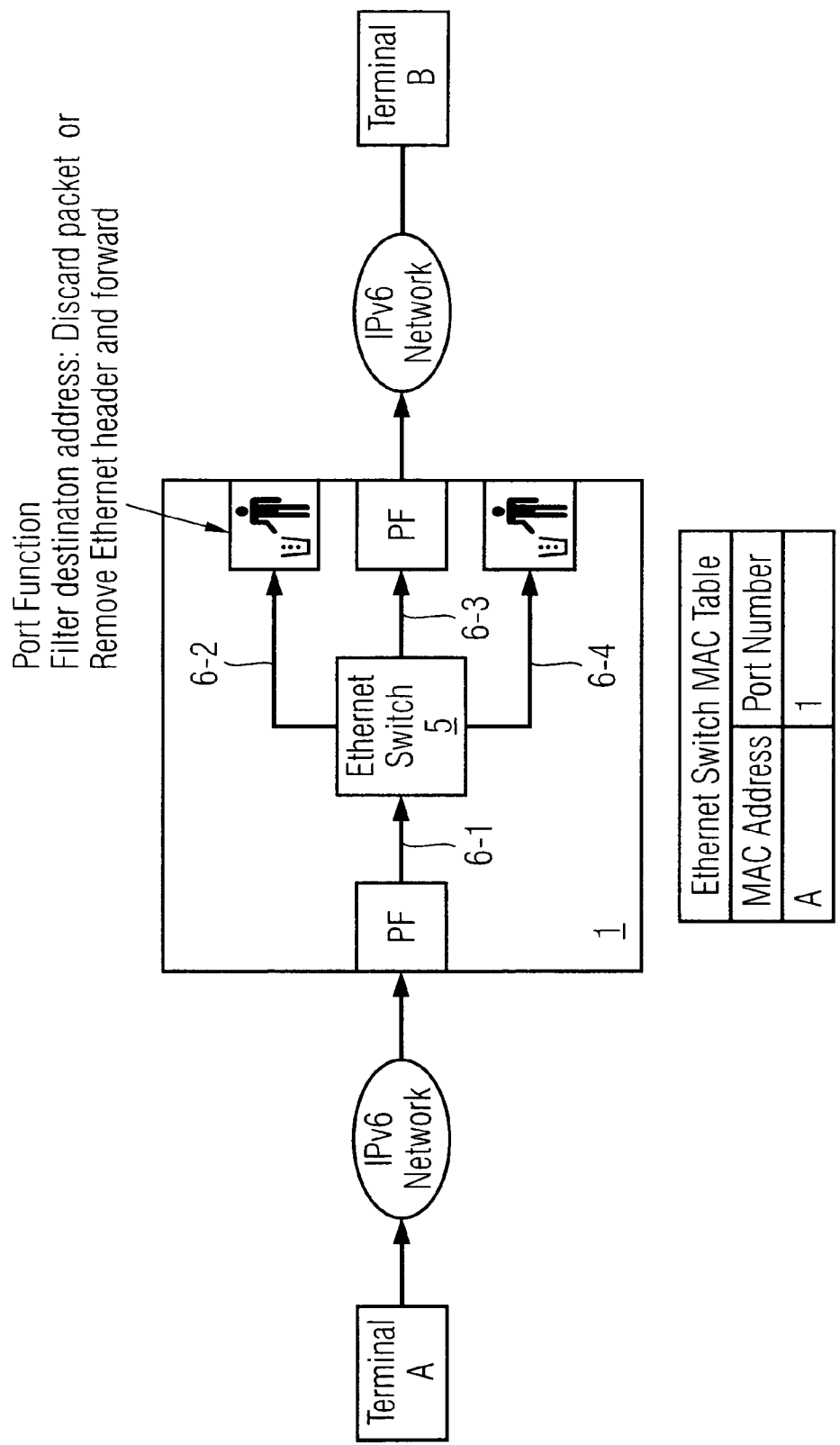

As shown in FIG. 24c the encapsulated Ethernet data packet is forwarded by the receiving port 2-1 to the Ethernet switch 5 which updates its internal MAC address table 5a as shown in FIG. 24c. The Ethernet switch 5 learns that the port number 1 for the first router port 2-1 corresponds to the MAC address A. The new Ethernet source addresses is stored in the MAC address table of the Ethernet switch 5. The Ethernet packets with unknown Ethernet destination addresses are sent to all router ports 2-i within the IP router 1. This process is also called flooding. In the example shown in FIG. 24d the Ethernet data packet received from port 2-1 is forwarded to all other ports 2-i within the router 1. The router ports 2-2, 2-3, 2-4 decapsulate the received Ethernet data packets to extract the original IP data packet and filter the decapsulated IP data packet by means of its respective Egress filter unit 2c as shown in FIG. 24e. In the shown example the Egress filter unit 2c of router ports 2-2 and 2-3 discard the decapsulated IP data packet whereas router port 2-3 forwards the decapsulated IPv6 data packet to terminal B. The Egress filter unit 2c of each port 2-2, 2-3, 2-4 looks in its local Egress memory 2d and filters all IP data packets which are not destined for the connected remote router 1 or terminal 4. Only the right port, in this case port 2-3 forwards the decapsulated and filtered IP data packet to the connected terminal. The other router ports 2-2, 2-4 discard the IP data packet. As shown in FIG. 24f the filtered IP data packet is transmitted to terminal B.

In the given example terminal B sends back an IPv6 data packet to terminal A. The destination address of the IPv6 data packet comprises the hierarchical prefix address A and as its address suffix the MAC address of terminal A. The source address of the sent IPv6 data packet is a hierarchical prefix indicating B and the address suffix formed by the MAC address of terminal B. As shown in FIG. 24*h* port 2-3 of router 1 encapsulates the received IP data packet.

Then as shown in FIG. 24*i* the encapsulated packet is forwarded to the Ethernet switch 5 which learns that port 2-3 having port number 3 corresponds to MAC address B. The destination address of the encapsulated packet is MAC address MAC A which is already stored in the Ethernet switch MAC table 5*a*. Consequently in this case no flooding is necessary and the Ethernet switch 5 directly forwards the encapsulated data packet to the router port 2 having router port number 1. As can be seen in FIG. 24*j* router port 2-1 decapsulates the forwarded Ethernet packet.

As can be seen in FIG. 24*k* the decapsulated IP data packet is sent to terminal A.

The Ethernet unit 5 of the IP router 1 according to the present invention comprises a MAC address memory 5*a* for storing dynamically (learning) in the MAC address table the source MAC address included in an IP data packet last received by a router port 2-*i* together with the port number of this router port.

The Ethernet unit 5 switches an Ethernet data packet from a router port to another router port which is identified by its port number when the port number of the other router port is stored in that MAC address table in correspondence to the destination MAC address of the encapsulated Ethernet data packet.

In contrast when no entry is found in the switch MAC address table the Ethernet unit 5 switches the Ethernet data packet to all other router ports for decapsulating (flooding).

In a preferred embodiment of the IP router according to the present invention the port number of a router port and the corresponding MAC address are cancelled after a cancellation default time has passed since reception of the last IP data packet by a router port (aging). The cancellation default time is programmable (for instance 300 seconds).

When a terminal is moved and connected to another port 2-*i* the MAC address table is updated and the next communication can take place. When the IP router 1 according to the present invention is used in a mobile IP application the terminal might be moved from one port to the next port within a short period of time. In this case the cancellation default time has to be programmed to a low value of e.g. several seconds.

To reduce flooding and to increase the performance of the IP router 6 each router port 2 according to the present invention comprises in a preferred embodiment an Ingress routing unit 3*e*, in particular to define uplink connections to remote uplink routers.

The central control unit 7 is connected to the Ethernet switch 5 and has access to all router ports for configuration and reconfiguration in case of link failures or port changes.

Routing of conventional IP router is performed on OSI reference layer 3, i.e. the network layer. The basic idea of the IP router 1 according to the present invention is to substitute a layer 3 routing function by a layer 2 switching function performed by the Ethernet switch 5 and a port filtering function performed decentrally in the IP router ports 2 by means of the respective Egress filter unit 2*c*. The routing functionality is realized in a distributed way by configuring filtering tables in a small Egress local memory 2*d* of each router port 2. An Egress local memory 2*d* of the router port 2 needs a much lower storage capacity than the routing memories of conventional IP routers. Instead of a central routing table the IP router 1 according to the present invention comprises a central switching core 5 and local Egress filtering means provided within the router ports 2. The filtering is performed in a decentral manner by each port 2 thus allowing local memories with a very low storage capacity.

A further advantage of the IPv6 router according to the present invention is that it is scalable. When increasing the number of IP router ports 2 for the IP router 1 the Ethernet switch 5 connected to all IP router ports 2 has only to be substituted by an Ethernet switch 5 having a higher throughput. Consequently the number of router ports can be increased step by step.

In a preferred embodiment the number of active IP ports 2 is increased by the control unit 7 enabling the IP ports 2 via control lines. By disabling not necessary IP ports 2 it is possible to minimize the power consumption of the IPv6 router according to the present invention.

Since the IPv6 router according to the present invention comprises a central Ethernet switch core 5 the IPv6 router 1 can also perform Ethernet switching in case it also comprises Ethernet ports. Both options can be supported in parallel. An IPv6 router 1 according to the present invention comprising both IP router ports 2 and additional Ethernet ports can support both Ethernet forwarding and IPv6 routing functionality.

The IPv6 router 1 has a unique external MAC address which is visible to all ports. The IPv6 address of the router itself is composed of an interface ID containing a MAC address and a prefix consisting of the router ID followed by zeros.

The local filtering tables stored within the ternary content addressable memory have to be updated only on rare occasions, i.e. when the local router hierarchy has changed. For the Ethernet switch core 5 standard Ethernet components or chips can be used thus decreasing costs for assembling an IPv6 router 1 according to the present invention.

Instead of central routing the IPv6 router 1 according to the present invention performs a decentral filtering within the IP router ports 2 and uses the functionality of a Ethernet switch 5 such as learning, aging and flooding. Any kind of Ethernet switch 5 can be used within the IPv6 router 1 according to the present invention.

The invention claimed is:

1. A router IP port for an IP router of an IP network system comprising:
    an encapsulating unit including an input operably connected to an IP sub-network and an output operably connected to an Ethernet unit and configured to encapsulate IP data packets received from the IP sub-network to generate Ethernet data packets and to forward the generated Ethernet data packets to the Ethernet unit of said IP router;
    a decapsulating unit including an input operably connected to the Ethernet unit and an output operably connected to the IP sub-network and configured to decapsulate Ethernet data packets received from said Ethernet unit to extract IP data packets to be forwarded; and
    an egress filter unit including an input operably connected to the output of the decapsualting unit and an output operably connected to the IP sub-network and configured to filter the extracted IP data packets in response to an internally generated match signal which is generated based upon a logical comparison of an hierarchical destination address prefix of said extracted IP data packets with configuration data.

2. The router IP port of claim 1 wherein the router IP port is on an integrated circuit.

3. The router IP port of claim 1, further comprising:
an egress comparison unit operably connected to the egress filter input; and
a local memory configured to store the configuration data.

4. An IP router for forwarding IP data packets within a hierarchical IP network system with a predetermined maximum number of sub-network levels comprising:
an Ethernet unit
a plurality of router ports, each of the plurality of router ports uniquely identified and operably connected to a respective IP sub-network and to the Ethernet unit, each of the plurality of router ports further comprising,
an encapsulating unit including an input operably connected to the respective IP sub-network and an output operably connected to the Ethernet unit and configured to encapsulate IP data packets received from the respective IP sub-network, to generate Ethernet data packets, and to forward the generated Ethernet data packets to the Ethernet unit,
a decapsulating unit including an input operably connected to the Ethernet unit and an output operably connected to the IP sub-network and configured to decapsulate Ethernet data packets received from said Ethernet unit to extract IP data packets to be forwarded, and
an egress filter unit including,
an input operably connected to the output of the decapsualting unit,
an egress comparison unit operably connected to the input of the egress filter unit,
an egress memory operably connected to the egress comparison unit, and
an output operably connected to the IP sub-network,
wherein the egress filter unit is configured to filter the extracted IP data packets extracted by said decapsulating unit in response to an egress match signal which is generated by the egress comparison unit which compares an hierarchical destination address prefix of said extracted IP data packets logically with configuration data stored in the egress memory of said router port.

5. The IP router of claim 4, wherein the IP router is configured to forward IPv6 data packets.

6. The IP router of claim 5, wherein the IP router is configured to forward IPv6 data packets with a header that comprises:
an IPv6 source address including a hierarchical source address prefix with a predetermined number of router identification data fields and a source address suffix including a source MAC-address of a source terminal; and
an IPv6 destination address including a hierarchical destination address prefix with the predetermined number of router identification data fields and a destination address suffix including a destination MAC-address of a destination terminal.

7. The IP router of claim 6, wherein the Ethernet unit has a MAC-address memory including a MAC-address table, and wherein the Ethernet unit is configured to dynamically store the source MAC-address of a first Ethernet data packet received from a first router port of the plurality of router ports and the unique identification of the first router port in the MAC-address table.

8. The IP router of claim 7, wherein the Ethernet unit is configured to switch a second Ethernet data packet received by said Ethernet unit from a second router port of the plurality of router ports to the first router port that is identified in the MAC-address table when the destination MAC-address in the received second Ethernet data packet corresponds to the identified first router port.

9. The IP router of claim 7, wherein the Ethernet unit is configured to switch the first Ethernet data packet received by said Ethernet unit from the first router port to each of the other plurality of router ports when the destination MAC-address in the received Ethernet data packet does not correspond to an identified router port in the MAC-address table.

10. The IP router of claim 7, wherein the IP router is configured to delete the stored source MAC-address and the stored unique identification of the first router port after a cancellation default time has passed since the reception of the first Ethernet data packet received from the first router port.

11. The IP router of claim 10, wherein the cancellation default time is programmable.

12. The IP router of claim 6, wherein the IP router is configured to forward IPv6 data packets comprising 64 bit source address prefixes.

13. The IP router of claim 6, wherein the IP router is configured to forward IPv6 data packets including a 48 bit source MAC-address.

14. The IP router of claim 6, wherein the IP router is configured to forward IPv6 data packets having a header further comprising:
a version data field;
a traffic class data field;
a flow label data field;
a first data field indicting the length of a payload data field;
a second data field indicating a next header; and
a third data field indicating a hop limit.

15. The IP router of claim 14, wherein the IP router is configured to forward IPv6 data packets having a payload data field.

16. The IP router of claim 4, wherein the Ethernet unit comprises at least one Ethernet switch operably connected to the input of the decapsulating unit and the output of the encapsulating unit of each of the plurality of router ports.

17. The IP router of claim 4, wherein the IP router further comprises at least one Ethernet port.

18. The IP router of claim 4, further comprising:
a configurable router identification register operably connected to the Ethernet unit and configured to store a predetermined number of router identification data fields that define the hierarchy level of said IP router, the predetermined number of router identification data fields identical to the predetermined maximum number of sub-network levels.

19. The IP router of claim 4, wherein the IP router has a first hierarchy level, and the plurality of router ports comprises at least one downlink router port configured to link the IP router to an IP router having a hierarchy level lower than the first hierarchy level.

20. The IP router of claim 4, wherein the IP router has a hierarchy level, and the plurality of router ports comprises at least one peerlink router port configured to link the IP router to a peer IP router having a hierarchy level that is the same as the IP router.

21. The IP router of claim 4, wherein the plurality of router ports comprises at least one default router port.

22. The IP router of claim 4, wherein the IP router has a first hierarchy level, and the plurality of router ports comprises at least one uplink router port configured to link the IP router to an IP router having a hierarchy level higher than the first hierarchy level.

23. The IP router of claim 4, wherein the egress filter unit comprises:
a prefix extraction circuit including an output and an input operably connected to the input of the egress filter and configured to extract the destination address prefix from the extracted IP data packet; and
a destination prefix register operably connected to the output of the prefix extraction circuit and configured to store the extracted destination address prefix, and wherein the egress comparison unit is further configured to compare the port configuration data stored in said egress memory with the stored destination address prefix.

24. The IP router of claim 23, wherein the egress comparison unit comprises a plurality of comparison logic means, each of the plurality of comparison logic means operably connected to the destination prefix register and the egress memory and configured to compare one bit of the stored destination prefix address with a corresponding bit of the stored port configuration data and to generate a bit match signal based upon the comparison.

25. The IP router of claim 24, wherein the comparison unit further comprises a AND-logic operably connected to the plurality of comparison logic means and configured to combine the bit match signals generated by said comparison logic means to generate said egress match signal.

26. The IP router of claim 25, wherein the egress filter unit further comprises a configuration logic operably connected to the AND-logic and configured to combine said egress match signal with a link configuration bit to generate a demultiplexer control signal.

27. The IP router of claim 26, wherein the egress filter unit further comprises a demultiplexer, the demultiplexer comprising:
an input operably connected to the input of the egress filter and configured to receive the extracted IP data packets from the decapsulating unit;
a first output operably connected to the IP sub-network and configured to forward the extracted IP data packets to the IP sub-network;
a second output operably connected to ground and operable to discard the extracted IP data packet; and
a select input operably connected to the configuration logic and operable to receive the demultiplexer control signal generated by the configuration logic.

28. The IP router of claim 26, wherein the configuration logic is an EXOR-logic.

29. A method of routing IP data packets within a hierarchical IP network system comprising:
encapsulating an IP data packets received by a first router port of a router to generate an Ethernet packet;
switching said Ethernet packet to a second router port of said router by means of an Ethernet switch;
decapsulating the switched Ethernet packet in said second router port to extract the received IP data packet;
comparing a hierarchical destination address prefix of the extracted IP data packet with a port configuration data stored in said second router port;
generating a match signal based upon said comparison;
filtering the IP data packet in response to the matched signal; and
forwarding the filtered IP data packet.

30. The IP router of claim 4, comprising:
a central control unit operably connected to each of the plurality of router ports, including a router configuration register configured to store router configuration data.

31. The IP router of claim 30, wherein each of the plurality of router ports comprises an egress memory operably connected to the central control unit.

32. The IP router of claim 31, wherein the central control unit is programmed to enable and disable each of the plurality of router ports in accordance with router configuration data stored in the router configuration register.

33. The IP router of claim 4, further comprising:
an ingress routing unit including an input operably connected to the IP sub-network and an output operably connected to the input of the encapsulating unit and programmed to route received IP data packets in accordance with a longest prefix match algorithm.

34. The IP router of claim 33, wherein the ingress routing unit comprises:
an ingress memory configured to store port configuration data;
a prefix extraction circuit operably connected to the ingress routing unit input and configured to extract a destination address prefix from a received IP data packet;
a destination prefix register operably connected to the prefix extraction circuit and configured to store the extracted destination address prefix from a received IP data packet; and
an ingress comparison unit operably connected to the destination prefix register and the ingress memory and configured to compare port configuration data stored in the ingress memory with the stored extracted destination address prefix from a received IP data packet.

35. The IP router of claim 34, wherein:
the stored port configuration data comprises a first plurality of bits;
the stored extracted destination address prefix from a received IP data packet comprises a second plurality of bits, each of the second plurality of bits corresponding to one of the first plurality of bits; and
the ingress comparison unit comprises a plurality of comparison logic means, each of the plurality of comparison logic means configured to compare a bit of the second plurality of bits with the corresponding bit of the first plurality of bits and to generate a bit match signal based upon the comparison.

36. The IP router of claim 35, wherein the ingress comparison unit further comprises an AND-logic operably connected to the plurality of comparison logic means and configured to combine the generated bit match signals and to generate an ingress match signal based upon the combination.

37. The IP router of claim 35, wherein the ingress memory is a RAM.

38. The IP router of claim 34, wherein:
the prefix extraction circuit is further configured store the extracted destination address prefix from a received IP data packet to the destination prefix register and to generate a load signal when the extracted destination address prefix from a received IP data packet is stored in the destination prefix register;
the ingress comparison unit is configured to generate an ingress match signal based upon the comparison of the port configuration data stored in the ingress memory with the stored extracted destination address prefix from a received IP data packet; and
the ingress routing unit further comprises a counter operably connected to the prefix extraction circuit and the ingress comparison unit and configured to generate a plurality of count values, wherein the load signal is configured to reset the counter and the ingress match signal is configured to disable the counter.

39. The IP router of claim 38, wherein the ingress routing unit further comprises:
an address decoder, operably connected to the counter and the ingress memory and configured to generate an internal address for addressing the stored port configuration in response to a received one of the plurality of count values from the counter.

40. The IP router of claim 39, wherein:
the ingress memory is configured to store a plurality of configuration entries in a respective plurality of internal addresses;
each of the plurality of configuration entries comprises port configuration data and a port number corresponding to the port configuration data and uniquely identifying each of the plurality of router ports; and
the address decoder is further configured to associate each of the plurality of count values with a respective one of the plurality of internal addresses, such that when one of the plurality of count values is received, the address decoder addresses the one of the plurality of internal addresses associated with the received one of the plurality of count values.

41. The IP router of claim 40, wherein the ingress routing unit further comprises:
a latch circuit operably connected to the ingress memory and the ingress comparison unit to read the port number in the internal address addressed by the address decoder when a match signal is generated.

42. The IP router of claim 40, further comprising:
a MAC-memory operably connected to the encapsulating unit and the ingress routing unit and configured to store the port number read from the internal address addressed by the address decoder when a match signal is generated.

43. The IP router of claim 4, wherein:
the encapsulating unit is further configured to encapsulate IP data packets comprising a header; and
the router is configured to generate an internal MAC-address based upon the header.

44. The IP router of claim 43, wherein:
the encapsulating unit is further configured to encapsulate IP data packets comprising a header with an address suffix; and
the router is configured to generate an internal MAC-address based upon the header by copying a part of the address suffix in the header.

45. The IP router of claim 44, further comprising:
an internal MAC-address generation unit operably connected to the encapsulating unit.

46. The IP router of claim 45, wherein the header comprises a source prefix address and the internal MAC-address generation unit further comprises:
a source prefix address register configured to store the source prefix address;
a generator polynomial register configured to store a generator polynomial;
a polynomial division unit operably connected to the source prefix address register and the generator polynomial register and configured to divide the source prefix address stored in the source prefix address register by the generator polynomial stored in the generator polynomial register to generate at least a portion of a unique internal MAC-address and
an internal MAC-address register operably connected to the polynomial division unit and configured to store the generated at least a portion of a unique internal MAC-address.

47. The IP router of claim 45, wherein the header comprises a source suffix address and the internal MAC-address generation unit further comprises:
a source suffix address register configured to store the source prefix address;
a generator polynomial register configured to store a generator polynomial;
a polynomial division unit operably connected to the source suffix address register and the generator polynomial register and configured to divide the source suffix address stored in the source suffix address register by the generator polynomial stored in the generator polynomial register to generate a first portion of a unique internal MAC-address;
a memory configured to store the identification of at least one of the plurality of uniquely identified plurality of router ports; and
an internal MAC-address register operably connected to the polynomial division unit and the memory and configured to store a generated unique internal MAC-address including the generated first portion of a unique internal MAC-address and the identification of at least one of the plurality of uniquely identified plurality of router ports, wherein the identification of the at least one of the plurality of uniquely identified plurality of router ports comprises a second portion of the unique internal MAC-address.

* * * * *